(12) United States Patent
Kayanuma

(10) Patent No.: US 8,644,122 B2
(45) Date of Patent: Feb. 4, 2014

(54) HEADER REGION EVALUATION CIRCUIT, OPTICAL DISK APPARATUS, AND HEADER REGION EVALUATION METHOD

(75) Inventor: Kinji Kayanuma, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/619,638

(22) Filed: Sep. 14, 2012

(65) Prior Publication Data

US 2013/0107689 A1 May 2, 2013

(30) Foreign Application Priority Data

Oct. 27, 2011 (JP) .................................. 2011-235956

(51) Int. Cl.
*G11B 27/36* (2006.01)

(52) U.S. Cl.
USPC ................ 369/59.16; 369/124.07; 369/47.22; 369/53.22; 369/124.13

(58) Field of Classification Search
None
See application file for complete search history.

(56) References Cited

U.S. PATENT DOCUMENTS

| | | | | |
|---|---|---|---|---|
| 5,999,506 A * | 12/1999 | Shoji et al. | ................. | 369/47.23 |
| 6,091,699 A | 7/2000 | Nakane et al. | | |
| 7,463,084 B2 * | 12/2008 | Hao et al. | ....................... | 327/553 |
| 2003/0206503 A1 * | 11/2003 | Kosoburd et al. | .......... | 369/44.29 |
| 2005/0073932 A1 * | 4/2005 | Shihara et al. | ............. | 369/59.21 |
| 2010/0188275 A1 * | 7/2010 | Kaihara et al. | ................ | 341/132 |

FOREIGN PATENT DOCUMENTS

JP 2000-200438 A 7/2000
JP 2002-288855 A 10/2002

* cited by examiner

*Primary Examiner* — Wayne Young
*Assistant Examiner* — Dionne Pendleton
(74) *Attorney, Agent, or Firm* — Sughrue Mion, PLLC

(57) ABSTRACT

A header region evaluation circuit includes a difference signal detection unit that detects a difference signal proportional to a difference in amounts of received light from an optical disc, a high pass filter that switches a plurality of cutoff frequencies according to a passband control signal, removes a low frequency component from the difference signal, and generates a difference signal HPF output, a waveform shaping unit that generates a shaping signal to convert the difference signal HPF output into a pulse, and a physical header detection sequencer that generates a groove detection signal for evaluating whether the physical header region is either one of a groove and an inter-groove and generates a passband control signal for controlling the cutoff frequency to be reduced for a difference signal corresponding to at least a part of the physical header region.

26 Claims, 14 Drawing Sheets

HEADER REGION EVALUATION CIRCUIT, OPTICAL DISK APPARATUS, AND HEADER REGION EVALUATION METHOD

CROSS-REFERENCE TO RELATED APPLICATIONS

This application is based upon and claims the benefit of priority from Japanese patent application No. 2011-235956, filed on Oct. 27, 2011, the disclosure of which is incorporated herein in its entirety by reference.

BACKGROUND

The present invention relates to an information recording and reproducing technology for optical discs, and relates to a header region evaluation circuit, an optical disc apparatus, and a header region evaluation method that evaluate a physical header region formed of pre-pits.

In DVD-RAM (Digital Versatile Disk Random Access Memory), both lands (inter-grooves) and grooves are used as a recording and reproducing region (information recording unit). Recording tracks formed in a spiral are divided into land tracks having the lands as recording regions and groove tracks having the grooves as the recording regions. The land and the groove tracks are switched every revolution of an optical disc. Each of the land and the groove tracks has an integer number of recording sectors per revolution of the optical disc and a physical header region representing address information and the like. The physical header region is provided before each recording sector and includes four each of the physical address regions. Two of the four physical address regions are provided on inner half of the track pitch from the center of the track, while the remaining two physical address regions are provided as embossed pits at the position offset to an outer circumference side from the center of the track by half the track pitch.

Offset polarities of the physical header regions can be used to distinguish the land and groove tracks. In the physical header region preceding the recording sector on the land track, first two of the four physical address regions are offset to the inner circumference side, and the last two physical address regions are offset to the outer circumference side. On the contrary, in the physical header region preceding the recording sector on the groove track, first two physical address regions are offset to the outer circumference side, and the last two physical address regions are offset to the inner circumference side. The optical disc apparatus uses a difference in amounts of reflected light received by a light receiving element including light receiving units divided into two along the tracks as a tracking error signal and a wobble signal. An offset in the physical header region can be detected by this difference in the amounts of reflected light. Thus, the difference in the amounts of reflected light is used to evaluate the land and groove tracks.

For example, Japanese Unexamined Patent Application Publication No. 2000-200438 discloses an optical disc tracking method and an optical disc apparatus using the same that offset the physical header region from the center of the tracks and use a disposed identification signal in order to determine whether it is the land or the groove track, and then switch tracking polarities according to the determination result. An operation of an optical disc apparatus 90 is explained with reference to FIG. 13.

A light receiving element including light receiving units that are divided into two in the direction along tracks of the optical disc 1 are mounted on a pickup 2. An output from the light receiving element is input to a sum signal detection unit 3 and a difference signal detection unit 4 and is respectively output as a signal proportional to a sum of the amounts of reflected light and a signal proportional to a difference in the amounts of reflected light. A sum signal output from the sum signal detection unit 3 is converted into binarized data by a reproducing signal processing unit 5 and is used to reproduce data recorded on the optical disc 1 or reproduce address information and the like from the embossed pits.

An outline of the process for a difference signal output from the difference signal detection unit 4 is explained using FIG. 14. The difference signal is input to a waveform shaping unit 7 and binarized by two comparators 701 and 702 including thresholds Lth and Rth. A shaping signal L0 obtained by binarization with the threshold Lth and a shaping signal R0 obtained by binarization with the threshold Rth are converted into delay signals L1 and R1. The delay signals L1 and R1 are switched to the level "1" in the difference signal processing unit 91 when a pulse train continues for a certain period (t1) and then after an elapse of a certain period (t2), switched to the level "0". Further, in the difference signal processing unit 91, the delay signal L1 is latched at a rising edge of the delay signal R1 from the level "0" to the level "1" and is output as a groove detection signal. Conversely, the delay signal R1 is latched at a rising edge of the delay signal L1 and output as a land detection signal. When either one of the groove detection signal and the land detection signal rises from the level "0" to the level "1", a header detection gate is reset to the level "0", and after an elapse of a period (t3) corresponding to the recording region of the recording sector, the header detection gate is switched to the level "1" again. Both the groove detection signal and the land detection signal are reset to the level "0" when a header detection signal is switched to the level "1".

Japanese Unexamined Patent Application Publication No. 2000-200438 indicates that it is possible to prevent false detection in the recording and reproducing region by detecting the pulse train in the shaping signals L0 and R0 only in the period when the header detection gate is the level "1" and excluding pulses appearing in the period when the header detection gate is the level "0" as noise. The information reproduction unit 92 performs a demodulation process and an error correction process based on the binarized data output from the reproducing signal processing unit 5 and the header detection gate output from the difference signal processing unit 91 and outputs reproduced data. The address reproduction unit 93 extracts and demodulates the address information on the embossed bits recorded in the physical address region based on the binarized data and the groove detection signal, the land detection signal, and the header detection gate output from the difference signal processing unit 91 and outputs the address information to the system control unit 11.

In response to the groove detection signal, the land detection signal, the header detection gate, and a signal indicating tracking on/off passed from the system control unit, a polarity control unit 94 selects the tracking polarity. The polarity selection unit 13 reverses the polarity of the difference signal output from the difference signal detection unit 4 according to the tracking polarity selection result by the polarity control unit 94 and outputs the difference signal to the tracking control unit 14. The tracking control unit 14 switches the tracking polarities according to the polarity selected by the polarity selection unit 13 and controls the pickup 2.

Such a configuration enables determination of whether a following track is the land or groove track by the offset in the physical header region and also enables correct tracking of the land and groove tracking by switching the tracking polarities and controlling the position of the pickup.

Moreover, in regard to tracking control of an optical disc apparatus, Japanese Unexamined Patent Application Publication No. 2002-288855, for example, discloses an apparatus capable of suppressing unstable tracking control due to an influence of an adjacent track and off-tracking.

As mentioned above, on DVD-RAM, the physical header regions formed by the embossed pits are offset to the inner and outer circumference sides relative to the center of the tracks. This offset polarity enables the evaluation of whether the following recording region is on the land track or groove track.

Guiding grooves of the land and groove tracks are wobbled sinusoidally on the recording regions of DVD-RAM. Further, disturbance by a contrast of a recording mark is also included in the difference signal in the recording region where data is recorded. Furthermore, a tracking error signal component indicating displacement of a focused beam emitted from the pickup 2 on the optical disc from the center of the tracks.

Therefore, a large offset often appears in the difference signal when a shock is applied to the optical disc 1.

In addition, when a tilt of the pickup 2 is not optimized, a signal amplitude obtained from a physical address offset to the inner circumference side and a signal amplitude obtained from a physical address offset to the outer circumference side may not be balanced.

In the physical header region formed by the embossed pits, usually a large difference signal amplitude than the recording mark is obtained.

However, disturbance and an imbalanced amplitude in the physical address makes it difficult to ensure an enough detection margin in the threshold.

There is a problem that when noise is generated in the difference signal due to a defect and the like while the detection margin is small, the physical header region is incorrectly evaluated.

Thus, there is disturbance by the contrast of the recording mark, a low-frequency offset caused by unstable tracking, and fluctuation caused by a defect in the difference signal that is used to detect the offset polarity, thereby hindering the evaluation of the physical header region.

In particular, incorrect evaluation of the land and groove tracks reverses a tracking servo polarity, and this leads to incorrect tracing of the recording and reproducing tracks.

Japanese Unexamined Patent Application Publication No. 2000-200438 describes a function that limits the period to detect the pulse train in the shaping signals L0 and R0 by the header detection gate and removes the pulse train appearing in the recording region of the recording sector as noise. Specifically, the detection gate is closed for the period corresponding to the recording region of the recording sector based on the header detection gate detected previously while tracing the recording track. This enables exclusion of the pulse train appearing due to a defect in the recording region. However, such a header detection gate is not effective in the case of detecting the physical header region immediately after a seek operation. Specifically, the header detection gate cannot be created based on the physical header region detected last time after the pickup 2 moves between the land and groove tracks during the seek operation. Moreover, as the pickup 2 crosses the plurality of tracks during the seek operation, large noise is generated in the difference signal. Thus, there is large noise in the difference signal immediately after the seek operation and the protection by the header detection gate cannot be expected, thereby generating a problem that makes it difficult to accurately detect the physical header region.

Additionally, Japanese Unexamined Patent Application Publication No. 2002-288855 discloses a method for separating land pre-pits adjacent on the inner and outer circumference sides of the tracks using a high pass filter and detecting an amplitude in order to suppress unstable tracking control and off-tracking. However, this technique does not aim to reduce the false detection of the physical header region.

SUMMARY

There has been a problem that an error occurres in the evaluation of the physical header region of the optical disc.

A header region evaluation circuit and a method for the same according to an embodiment realizes suppression of errors in the process to evaluate the physical header region by appropriately using a high pass filter on the difference signal detected by an optical disc apparatus.

An aspect of an embodiment is a header region evaluation circuit for evaluating a physical header region formed on an optical disc and includes a difference signal detection unit, a high pass filter, a waveform shaping unit, and a physical header detection unit. The optical disc includes both a groove and an inter-groove formed on the optical disc as information recording units that are formed of one recording spiral composed by alternately connecting a recording track on the groove and a recording track on the inter-groove, and also the optical disc is composed of a plurality of recording sectors including a physical header region and a recording region. The difference signal detection unit detects a difference signal proportional to a difference in amounts of received light from the optical disc received by a light receiving element including light receiving units divided into two. The high pass filter receives a passband control signal and the difference signal, switches a plurality of cutoff frequencies according to the passband control signal, removes a low frequency component from the difference signal, and generates a difference signal HPF output. The waveform shaping unit holds a pulse threshold, converts the difference signal HPF output into a pulse using the pulse threshold, and generates a shaping signal. The physical header detection unit measures duration of the pulse indicated by the shaping signal, detects the physical header region, generates a groove detection signal for evaluating whether the physical header region is either one of the groove and the inter-groove based on a detection result of the physical header region, and generates the passband control signal for controlling a cutoff frequency of the high pass filter to be reduced for the difference signal corresponding to at least a part of the physical header region.

Such a configuration adjusts the cutoff frequency of the high pass filter according to the detection result of the physical header region. Thus, the physical header detection unit generates the passband control signal for controlling the cutoff frequency of the high pass filter that switches the plurality of cutoff frequencies according to the passband control signal. Such a configuration reduces a failure to detect the physical header region as a level of the low frequency component to be removed is reduced in at least a part of the detection period for the physical header region. On the other hand, as the cutoff frequency of the high pass filter is returned after the physical header region is recognized as detected, it is possible to avoid false detection of the physical region based on an error component included in the difference signal. This suppresses false detection of the physical header region.

Further, another aspect of an embodiment is an optical disc apparatus that sets the optical disc as the one described above, reproduces information recorded on the optical disc, and further includes an optical pickup having a light receiving element with light receiving units divided into two in addition to the aforementioned difference signal detection unit, the high pass filter, the waveform shaping unit, and the physical header detection unit as a configuration related to realize a header region evaluation method according to the embodiment. Moreover, the optical disc apparatus includes at least a polarity control unit for controlling a tracking polarity according to a groove detection signal.

Furthermore, another aspect of an embodiment is the header region evaluation method for evaluating a physical header region of an optical disc including both a groove and an inter-groove formed on the optical disc as information recording units that are formed of one recording spiral composed by alternately connecting a recording track on the groove and a recording track on the inter-groove and the optical disc also being composed of a plurality of recording sectors including a physical header region and a recording region. The header region evaluation method firstly detects a difference signal proportional to a difference in amounts of received light from the optical disc received by light receiving units divided into two, switches a plurality of cutoff frequencies, removes a low frequency component from the difference signal, and generates a difference signal HPF output. Next, the header region evaluation method pulses the difference signal HPF output using a previously held pulse threshold, generates a shaping signal, measures duration of a pulse indicated by the shaping signal, and detects the physical header region. Then, the header region evaluation method controls the cutoff frequency of the high pass filter for a difference signal corresponding to at least a part of the physical header region based on a detection result of the physical header region. The header region evaluation method evaluates whether the physical header region is the groove or the inter-groove when the physical header region is detected. Controlling the cutoff frequency of the high pass filter according to the detection result of the physical header region adjusts a level of the low frequency component to be removed from the difference signal. This appropriately removes an error component in the difference signal and thereby suppresses false detection of the physical header region while reducing the low frequency component to be removed and prevents a failure to detect the physical header region in at least a part of the detection period for the physical header region.

According to the embodiment, it is possible to suppress an error from occurring in the evaluation of the physical header region.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
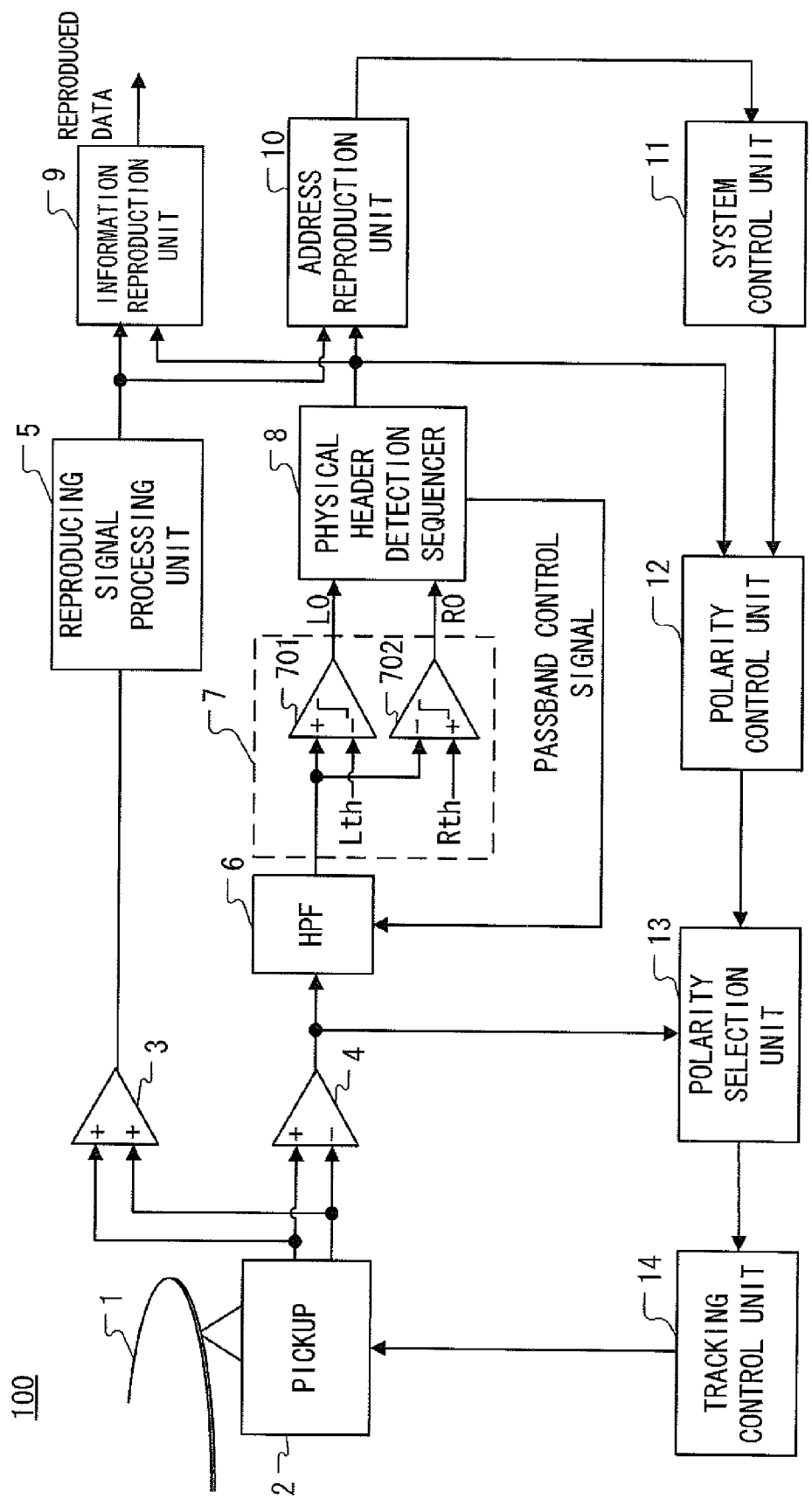
FIG. 1 is a diagram showing a configuration example of an optical disc apparatus according to a first embodiment.

Hereinafter, embodiments are explained with reference to the drawings. Following explanation and drawings are omitted and simplified as appropriate for clarity of the explanation. Components and corresponding parts having the same configuration or function in each drawing are denoted by the same reference numerals, and the explanation thereof is omitted.

Each of the following embodiments explains the case of DVD-RAM as an optical disc. However, when the optical disc has the following features, each embodiment can be incorporated other than DVD-RAM. The optical disc set to the optical disc apparatus of each embodiment includes both grooves and inter-grooves (hereinafter also referred to as a "land" as appropriate) that are circumferentially formed on the optical disc as information recording units. The information recording unit forms one recording spiral that is composed of groove recording tracks (hereinafter also referred to as a "groove track" as appropriate) and inter-groove recording tracks (hereinafter also referred to as a "land track") formed alternately. In addition, each recording track on the grooves and the lands is composed of an integer number of recording sectors per revolution of the optical disc. Each recording sector includes a physical header region and a recording region.

The physical header region is disposed at the beginning of the recording sector. In the two recording sectors disposed adjacent to the groove recording track and the inter-groove recording track, the physical header regions are arranged on the same radius as the physical header region of the adjacent recording sector. In other words, the physical header regions of each recording sector are arranged along a radius line between one recording sector and another recording sector disposed on the outer or inner circumference side of the one recording sector.

The physical header region includes an identification signal representing address information and has a first part (first half) and a second part (last half). An end of the second part is a boundary with the recording region.

The first part is common between the groove recording track and the inter-groove recording track adjacent to the groove recording track on the outer circumference side and is formed using the address information of the inter-groove recording track.

The second part is common between the groove recording track and the inter-groove recording track adjacent to the groove recording track on the inner circumference side and is formed using the address information of the groove recording track.

Hereinafter, each embodiment is explained with reference to the drawings.

First Embodiment

FIG. 1 is a block diagram showing a configuration example of an optical disc apparatus according to a first embodiment.

Figure 13:
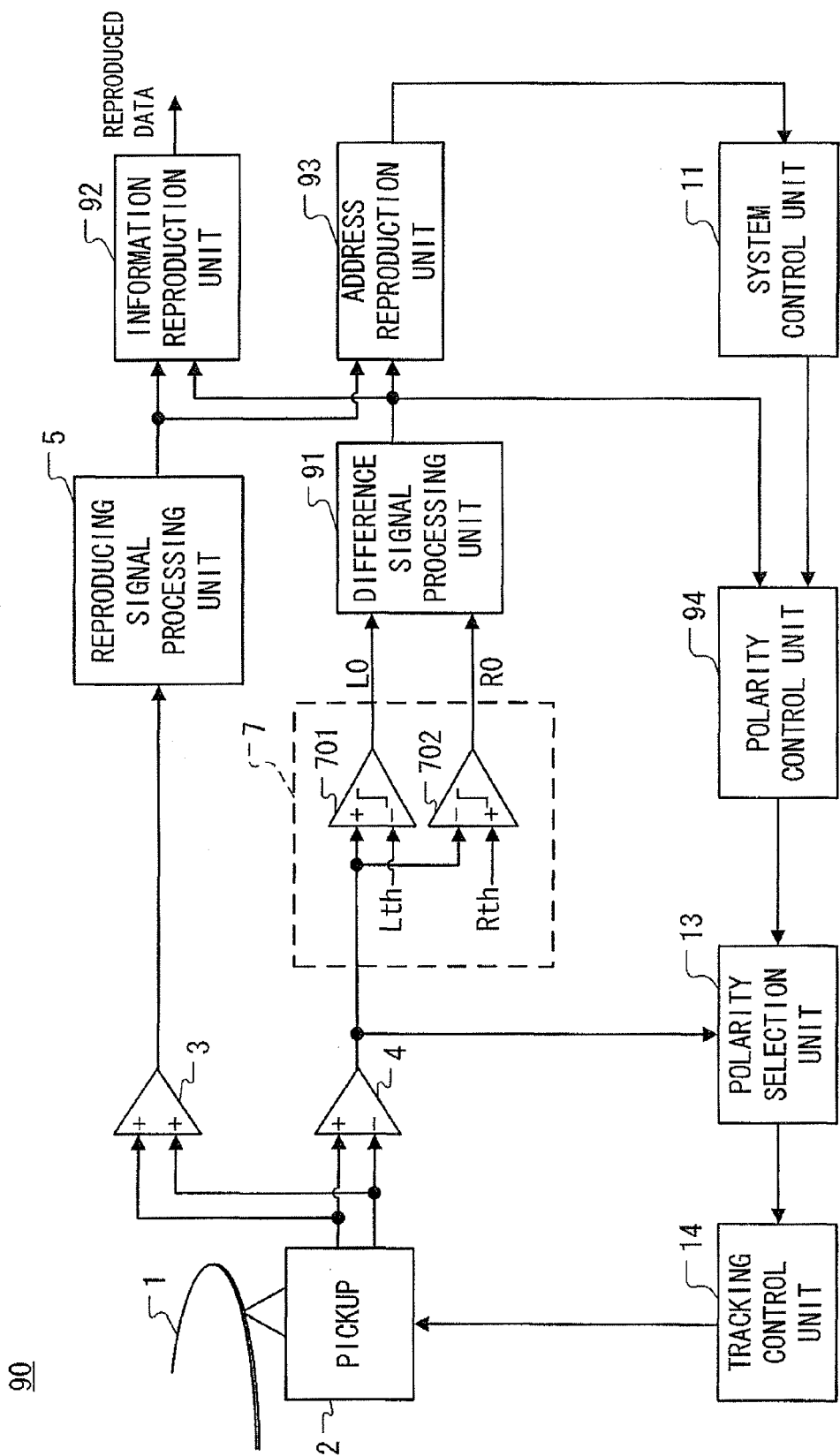
FIG. 13 is a diagram showing an example according to a related art.
Figure 14:
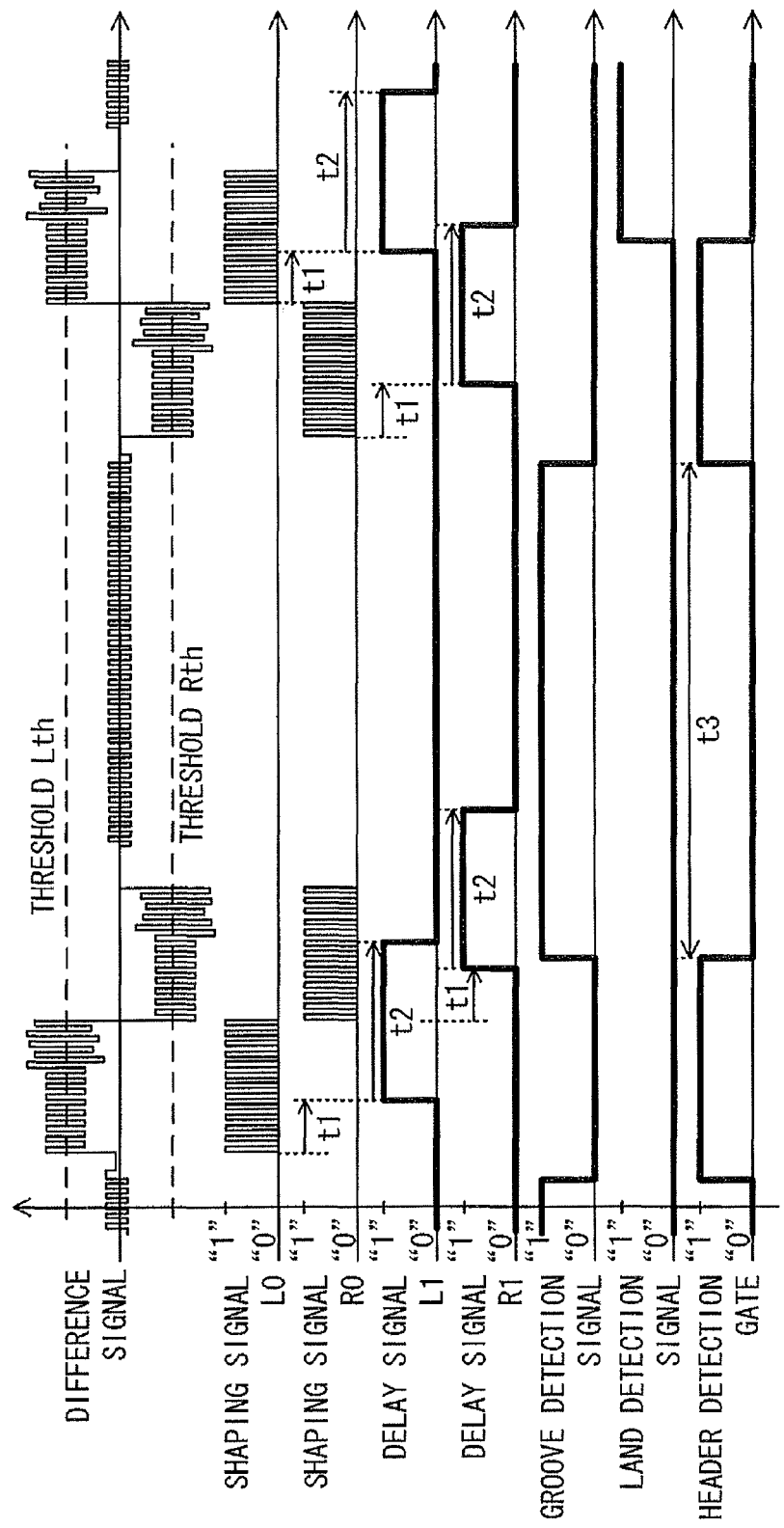
FIG. 14 is a diagram showing signal waveforms of each unit according to the example of the related art.

An optical disc apparatus 100 includes a pickup 2, a sum signal detection unit 3, a difference signal detection unit 4, a reproducing signal processing unit 5, a high pass filter (HPF) 6, a waveform shaping unit 7, a physical header detection sequencer (physical header detection unit) 8, an information reproduction unit 9, an address reproduction unit 10, a system control unit 11, a polarity control unit 12, a polarity selection unit 13, and a tracking control unit 14. The optical disc apparatus 100 further includes means to set an optical disc 1. As the components with the same reference numerals as in FIG. 13 have the similar functions, the explanation is omitted as appropriate.

The pickup 2 detects reflected light from the optical disc 1, converts the detected reflected light into a detection signal, and outputs the detection signal to the sum signal detection unit 3 and the difference signal detection unit 4. The pickup 2 includes light receiving units divided into two. The two light receiving units convert the received reflected light into a first and second detection signals and outputs the first and second detection signals.

The sum signal detection unit 3 adds the first detection signal and the second detection signal and outputs a sum signal proportional to the amount of reflected light.

The difference signal detection unit 4 calculates a difference between the first and second detection signals and outputs a difference signal.

The reproducing signal processing unit 5 receives the sum signal, performs a waveform equalization process and data evaluation, converts the sum signal into binarized data, and outputs the binarized data to the information reproduction unit 9 and the address reproduction unit 10.

The high pass filter 6 removes a low frequency component from the difference signal output from the difference signal detection unit 4 to generate a difference signal HPF output and outputs the difference signal HPF output to the waveform shaping unit 7. The high pass filter 6 further includes a function to switch a plurality of cutoff frequencies according to a passband control signal output from the physical header detection sequencer 8. The high pass filter 6 can set up at least a first cutoff frequency and a second cutoff frequency that is set with a frequency lower than the first cutoff frequency as the plurality of cutoff frequencies and switches the first and second cutoff frequencies according to the passband control signal.

The waveform shaping unit 7 receives the difference signal HPF output, generates a shaping signal, and outputs the shaping signal to the physical header detection sequencer 8. Specifically, the waveform shaping unit 7 binarizes the input signal (the difference signal HPF output) by two comparators 701 and 702 having pulse thresholds Lth and Rth and outputs a shaping signal L0 from the comparator 701 and outputs a shaping signal R0 from the comparator 702. The pulse thresholds Lth and Rth are previously set values and respectively held by the comparators 701 and 702. In other words, the waveform shaping unit 7 holds pulse thresholds, generates, based on the difference signal HPF output, the shaping signals indicating a first pulse that appears on a first polarity side exceeding a pulse threshold and a second pulse that appears on a second polarity side in which the pulse exceeding another pulse threshold is different from the first polarity side, and outputs the shaping signals.

The physical header detection sequencer 8 measures duration of the pulse indicated by the shaping signal, detects the physical header, and generates a groove detection signal and the passband control signal based on the detection result of the physical header region. The groove detection signal is a signal that evaluates whether the physical header region is the groove or the land. In other words, the groove detection signal indicates whether the recording region of the recording sector is on the land track or the groove track. The passband control signal is a signal that controls the cutoff frequency of the high pass filter 6 to be reduced for the difference signal corresponding to at least a part of the physical header region. In other words, the passband control signal gives an instruction to switch the cutoff frequencies of the high pass filter 6 according to the detection result of the physical header region.

This embodiment explains the case in which the physical header detection sequencer 8 generates the passband control signal for controlling the cutoff frequency of the high pass filter 6 to be reduced for apart of the difference signal corresponding to either one of the first and second parts in the physical header region. Specifically, this embodiment explains the case of generating the passband control signal, after evaluating that a beginning of the physical header region is detected, for controlling the second cutoff frequency to be set to the high pass filter 6 in a period from when a beginning region of the first part is detected until a beginning region of the second part is detected and controlling the first cutoff frequency to be set to the high pass filter 6 in other periods.

Further, the physical header detection sequencer 8 evaluates the physical header region of the recording sector based on the shaping signals L0 and R0 and generates an OPID detection signal and an IPID detection signal. The OPID detection signal indicates that the physical header region recorded by an offset to the outer circumference side is detected. The IPID detection signal indicates that the physical header region recorded by an offset to the inner circumference side is detected.

The information reproduction unit 9 performs a demodulation process and an error correction process using the binarized data that is output from the reproducing signal processing unit 5 and the OPID detection signal and the IPID detection signal that are output from the physical header detection sequencer 8 and outputs reproduced data. Specifically, the information reproduction unit 9 evaluates the binarized data recorded in the recording region based on that a logical sum between the IPID detection signal and the OPID detection signal is the level "0" in the recording region, and demodulates and corrects the binarized data.

The address reproduction unit 10 extracts and demodulates the address information on the embossed pits recorded in the physical address region using the binarized data output from the reproducing signal processing unit 5 and the OPID detection signal and IPID detection signal output from the physical header detection sequencer 8 and outputs the address information to the system control unit 11. Specifically, the address reproduction unit 10 evaluates the binarized data obtained from the embossed pits formed in the physical header region based on that either one of the IPID detection signal and the OPID detection signal takes the level "1" in the physical header region and reproduces an address from the evaluated binarized data.

The polarity control unit 12 receives the groove detection signal output from the physical header detection sequencer 8 and a signal indicating tracking on/off output from the system control unit 11, selects a tracking polarity, and outputs the result of tracking polarity selection (a tracking polarity selection signal).

The polarity section unit 13 reverses the polarity of the difference signal output from the difference signal detection unit 4 according to the result of tracking polarity selection by the polarity control unit 12 and outputs the difference signal to the tracking control unit 14.

Figure 2:
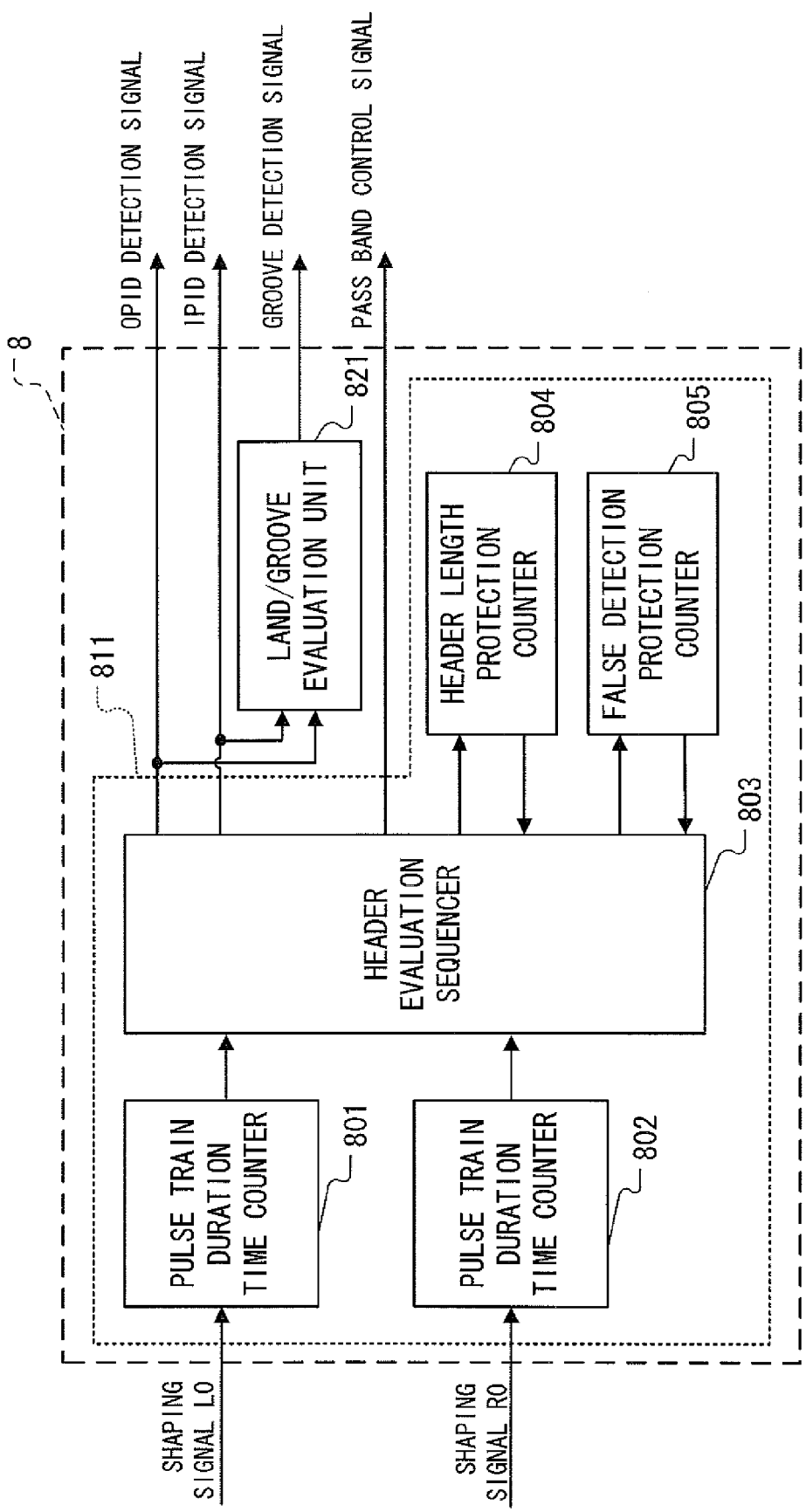
FIG. 2 is a diagram showing a configuration example of a physical header detection sequencer according to the first embodiment.
Figure 3:
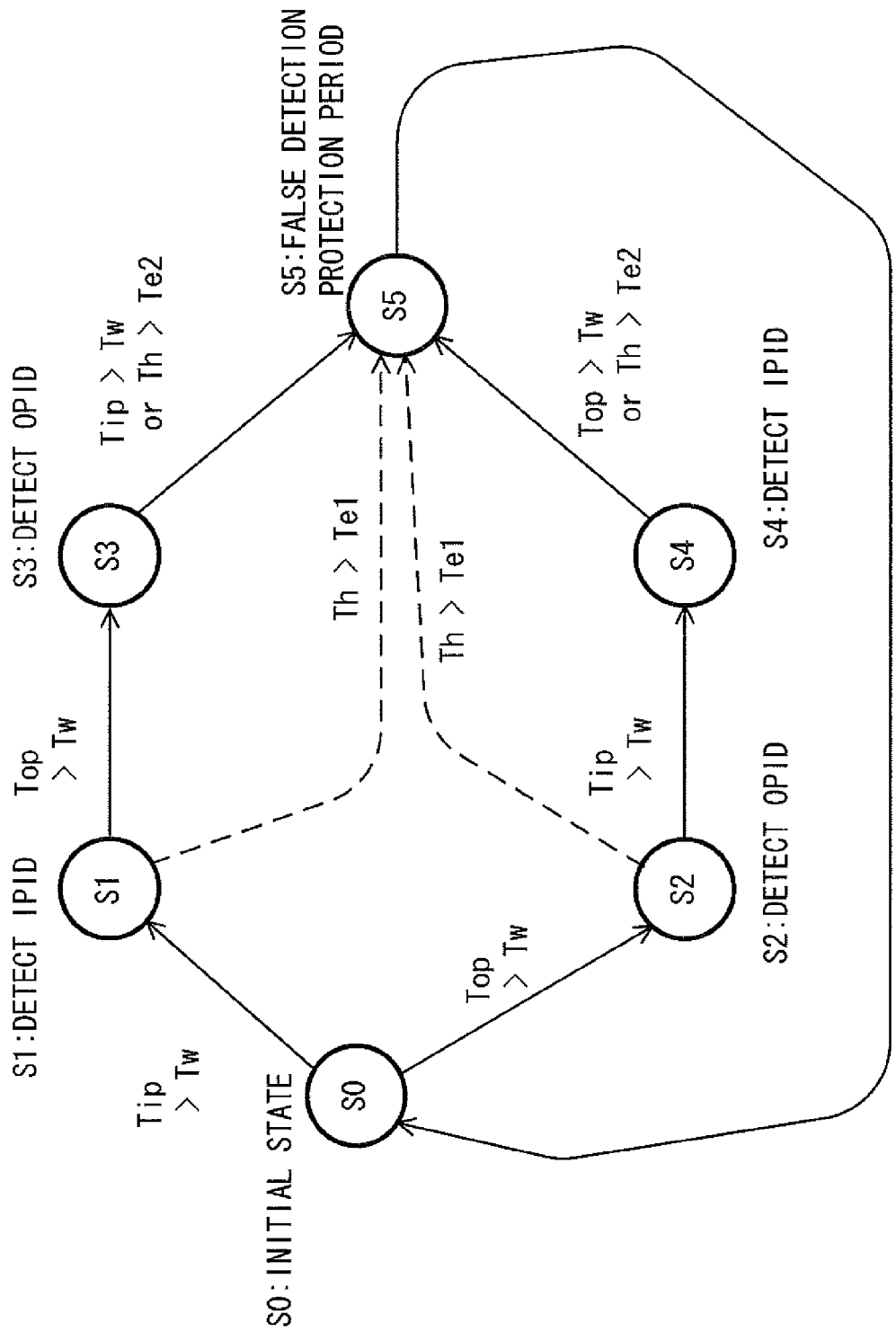
FIG. 3 is a diagram showing an example of a state transition of a header evaluation sequencer according to the first embodiment.

Next, details of the physical header detection sequencer 8 are explained in detail with reference to FIGS. 2 and 3. FIG. 2 shows a configuration example of the physical header detection sequencer 8 according to the first embodiment. FIG. 3 shows an example of a state transition of the header evaluation sequencer according to the first embodiment. The physical header detection sequencer 8 includes a header evaluation unit 811 and a land/groove evaluation unit 821. In addition, the header evaluation unit 811 shown in FIG. 2 includes pulse train duration counters 801 and 802, a header evaluation sequencer 803, a header length protection counter 804, and a false detection protection counter 805.

In the physical header detection sequencer 8, the header evaluation unit 811 receives the shaping signals L0 and R0, the header evaluation unit 811 outputs the OPID detection signal and the IPID detection signal to the land/groove evaluation unit 821, the information reproduction unit 9, and the address reproduction unit 10 and outputs the groove detection signal to the polarity control unit 12, and the land/groove evaluation unit 821 outputs the passband control signal to the high pass filter 6.

The header evaluation unit 811 holds a pulse duration threshold (hereinafter also referred to as a "threshold Tw" as appropriate). The pulse duration threshold is a pulse width for evaluating the detection of the physical header region, and the pulse width specifies a pulse or the time when pulses continuously appears. First, upon detection of a first pulse, the header evaluation unit 811 measures duration of the detected first pulse. Then, when the measured duration exceeds the pulse duration threshold, the header evaluation unit 811 generates and outputs the passband control signal for controlling the second cutoff frequency to be set to the high pass filter 6. Next, after the first pulse is detected, upon detection of a second pulse, the header evaluation unit 811 measures duration of the detected second pulse. Then, when the measured duration exceeds the pulse duration threshold, the header evaluation unit 811 generates and outputs the passband control signal for controlling the first cutoff frequency to be set to the high pass filter 6. Moreover, after the second pulse is detected, when a third pulse with the same polarity as the first pulse is detected, the header evaluation unit 811 measures duration of the third pulse. Then, when the measured duration exceeds the pulse duration threshold, the header evaluation unit 811 evaluates that the detection of the physical header region has succeeded and outputs the polarities of the first and second pulses. In FIG. 1, the first pulse here is a pulse exceeding one of the pulse thresholds Lth and Rth, and the second pulse is a pulse exceeding the other pulse threshold, i.e., a pulse threshold with a different polarity from the first pulse.

The land/groove evaluation unit 821 evaluates whether the recording sector including the evaluated physical header region is the groove or the land according to the polarities of the first and second pulses and generates the groove detection signal. Specifically, the land/groove evaluation unit 821 obtains the polarity of the pulse detected in first and second regions according to the OPID detection signal and the IPID detection signal and generates the groove detection signal.

Then, the details of the header evaluation unit 811 are explained.

The pulse train duration counter (the first pulse train duration counter) 801 notifies the header evaluation sequencer 803 that a pulse train has appeared in the period of the pulse width threshold Tw in the shaping signal L0. Specifically, the pulse train duration counter 801 holds the threshold Tw, receives the shaping signal L0 input to the physical header detection sequencer 8, measures time Top (hereinafter also referred to as "pulse duration Top" or "time Top" as appropriate) in which the pulse train appears in the shaping signal L0, and increases the value of the counter. Then, when the value of the counter (the pulse duration Top) exceeds the threshold Tw, the pulse train duration counter 801 notifies the header evaluation sequencer 803.

In a similar manner as the pulse train duration counter 801, the pulse train duration counter (the second pulse train duration counter) 802 notifies the header evaluation sequencer 803 that the pulse train appears in the period of the threshold Tw of the pulse width in the shaping signal R0. Specifically, the pulse train duration counter 802 holds the threshold Tw, receives the shaping signal R0 that is to be input to the physical header detection sequencer 8, measures time Tip (hereinafter also referred to as "pulse duration Tip" or "time Tip") in which the pulse train appears in the shaping signal R0, and increases the value of the counter. Then, when the value of the counter (the pulse duration Tip) exceeds the threshold Tw, the pulse train duration counter 802 notifies the header evaluation sequencer 803.

In addition, the pulse train duration counter 801 holds a predetermined threshold Tr, and after an elapse of the threshold Tr period from when the pulse train stops appearing in the shaping signal L0, resets the value held by the counter and starts measuring the time Top again at the time when the pulse train appears in the shaping signal L0 next time. Similarly, after an elapse of the threshold Tr period from when the pulse train stops appearing in the shaping signal R0, the pulse train duration counter 802 resets the value held by the counter and starts measuring the time Tip again at the time when the pulse train appears in the shaping signal R0 next time.

Time shorter than the threshold Tw and appropriate time for detecting that the pulse train stops appearing is set to the threshold Tr. This is to correspond to the pulse train that appears correspondingly to the first and second parts of the physical header region. Specifically, in the shaping signal L0 or the shaping signal R0, after the pulse train exceeding the threshold Tw appears from the beginning of the first part in the physical header region, the pulse train is not detected in the second part. After that, as a step is created in the boundary between the physical header region and the recording region, the pulse train appears again in the shaping signal in which the pulse train appeared in the first part. The pulse train in the step corresponds to the end of the physical header region. The pulse train duration counters 801 and 802 are reset at the time when the threshold Tr has passed since the pulse train is not detected using the threshold Tr in order to measure the duration of this pulse train.

The header evaluation sequencer 803 holds and updates an internal state based on notifications from the pulse train duration counters 801 and 802 and notifications from the header length protection counter 804 and the false detection protection counter 805. The internal state indicates the state of the shaping signals L0 and R0 and is divided into six types of transition states from an initial state S0 to a state S5. The transition states are explained later with reference to FIG. 3.

In addition, the header evaluation sequencer 803 controls the OPID detection signal, the IPID detection signal, and the passband control signal according to the internal state.

The header length protection counter 804 measures time elapsed since the internal state held by the header evaluation sequencer 803 transitions from the initial state S0 to the state S1 or the state S2 as elapsed time Th. The header length protection counter 804 holds a region detection threshold that limits the period to detect the physical header region, compares the elapsed time Th with the region detection threshold, and when the elapsed time Th exceeds the region detection threshold, notifies the header evaluation sequencer 803. This embodiment explains the case of using thresholds Te1 and Te2 as the region detection thresholds. The threshold Te1 is a subregion detection threshold that limits the period for detecting the second part of the physical header region after the first part of the physical header region is detected, and a period corresponding to the length of the first part is set to the threshold Te1. The threshold Te2 is a header region detection threshold that limits the period for detecting the physical header region after the first part of the physical header region is detected, and a period corresponding to the length of the physical header is set to the threshold Te2. The header length protection counter 804 has a function to protect the optical disc when the pulse train in the shaping signals L0 and R0 are falsely detected due to noise and the like by measuring the elapsed time Th.

The false detection protection counter 805 measures elapsed time Tm since the internal state held by the header evaluation sequencer 803 transitions to the state S5 and notifies the header evaluation sequencer 803 at the time when a certain time (a threshold Te3) for false detection protection has passed. The false detection protection counter holds the previously set arbitrary time threshold Te3 for protecting the optical disc apparatus from false detection.

Within the header evaluation unit 811, the header length protection counter 804 and the false detection protection counter 805 are configured to perform processes according to the internal state held by the header evaluation sequencer 804.

Next, the state (the internal state) of the shaping signals L0 and R0 held internally and updated by the header evaluation sequencer 803 is explained with reference to FIG. 3. The initial state S0 is an initial state for starting to detect the physical header region and is a state for the header evaluation sequencer 803 to wait for the pulse train to appear in the shaping signals L0 and R0. The state S1 is a state where the pulse train is detected in the shaping signal L0 (an IPID detected state), and the state S2 is a state where the pulse train is detected in the shaping signal R0 (an OPID detected state). In other words, the states S1 and S2 are the states where the pulses (the pulse train) appear in either of the shaping signals L0 and R0 and the pulse of the first polarity is detected.

The state S3 is a state where the pulse train is detected in the shaping signal R0 after the pulse train is detected in the shaping signal L0 (the OPID detected state). The state S4 is a state where the pulse train is detected in the shaping signal L0 after the pulse train is detected in the shaping signal R0 (the IPID detected state). In other words, the states S3 and S4 are the states where the pulse with the second polarity that is different from the first polarity is detected after the pulse with the first polarity is detected. The state S5 is a protection period for protecting from false detection and is set before returning to the initial state S0.

The header evaluation sequencer 803 receives from the pulse train duration counter 802 the notification (an IPID pulse train detection signal) indicating that the time Tip, which is the time for the pulse train in the shaping signal R0 to continue, has exceeded the threshold Tw (Tip>Tw) in the initial state S0. In response to reception of the notification, the header evaluation sequencer 803 evaluates that the first region of the physical header region that offset the pulse train to the inner circumference side is detected, and the internal state transitions from the initial state S0 to the state S1.

On the other hand, the header evaluation sequencer 803 receives from the pulse train duration counter 801 the notification (an OPID pulse train detection signal) indicating that the time Top, which is the time for the pulse train in the shaping signal L0 to continue, exceeds the threshold Tw (Top>Tw) in the initial state S0. In response to reception of the notification, the header evaluation sequencer 803 evaluates that the first region of the physical header region that offset the pulse train to the outer circumference side is detected, and the internal state transitions from the initial state S0 to the state S2.

When the internal state transitions from the initial state S0 to the state S1 or the state S2, the header evaluation sequencer 803 notifies the header length protection counter 804.

The header length protection counter 804 measures the time elapsed since the internal state of the header evaluation sequencer 803 transitions from the initial state S0 to the state S1 or the state S2 as the elapsed time Th.

Next, the state transition after the internal state transitions from the initial state S0 to the state S1 is explained.

When the header evaluation sequencer 803 receives from the pulse train duration counter 801 the notification indicating that the time Top, which is the time for the pulse train in the shaping signal L0 to continue, exceeds the threshold Tw in the state S1, the internal state transitions to the state S3.

However, in the state 1, when the elapsed time Th measured by the header length protection counter 804 exceeds the threshold Te1, which corresponds to the length of the first part of the physical header region, the header evaluation sequencer 803 receives from the header length protection counter 804 the notification (a detection timeout notification of the subregion) indicating that the detection time is out (Th>Te1). When the header evaluation sequencer 803 receives the detection timeout notification of the subregion, the header evaluation sequencer 803 makes the internal state transition from the state S1 to the state S5.

Next, in the state S3, the pulse or the pulse train appears in the shaping signal R0 by the step between the physical header region and the recording region in the boundary between the physical header region and the recording region. When the pulse or the pulse train appearing in the shaping signal R0 is detected, the pulse train duration counter 802 starts measuring the time Tip. As the threshold Tr has passed since the pulse train detected last time stops appearing at the time of starting the measurement, the pulse train duration time counter 802 is reset. The pulse train duration counter 802 notifies the header evaluation sequencer 803 when the time Tip exceeds the threshold Tw. When the header evaluation sequencer 803 receives the notification from the pulse train duration counter 802 in the state 3, the header evaluation sequencer 803 evaluates that the end of the physical header region is detected, and the internal state transitions to the state S5.

However, in the state S3, when the elapsed time Th measured by the header length protection counter 804 exceeds the threshold Te2 that corresponds to the length of the entire physical header region, the header evaluation sequencer 803 receives from the header length protection counter 804 the notification (the detection timeout notification of the header region) indicating that the detection time is out. When the header evaluation sequencer 803 receives the detection timeout notification of the header region, the header evaluation sequencer 803 forces the internal state to transition to the state S5 without waiting for the notification that the time Tip exceeds the threshold Tw indicating that the end of the physical header region is detected.

When the internal state transitions from any one of the states S1 to S4 to the state S5, the header evaluation sequencer 803 notifies the false detection protection counter 805. When the false detection protection counter 805 is notified of the transition to the S5 from the header evaluation sequencer 803, the false detection protection counter 805 measures the elapsed time Tm since the internal state transitioned to the state S5 and notifies the header evaluation sequencer 803 when the certain time Te3 for false detection protection has passed. In response to reception of this notification, the header evaluation sequencer 803 makes the internal state transition to the state S0 and continues to detect the pulse train again in the shaping signals L0 and R0. When the internal state transitions to the initial state S0, the value held by each counter is initialized.

Next, the state transition after the transition from the initial state S0 to the S2 is explained. When the header evaluation sequencer 803 receives the notification that the pulse train duration Tip in the shaping signal R0 exceeds the threshold Tw in the state S2, the internal state transitions to the state S4. However, in a similar manner as the state S1, when the elapsed time Th measured by the header length protection counter 804 exceeds the threshold Te1 in the state S2, the header evaluation sequencer 803 receives from the header length protection counter 804 the notification (the detection timeout notification of the subregion) indicating that the detection time is out (Th>Te1). When the header evaluation sequencer 803 receives the detection timeout notification of the subregion, the header evaluation sequencer 803 makes the internal state transition from the state S2 to the state S5.

Next, in the state S4, the pulse or the pulse train appears in the shaping signal L0 by the step between the physical header region and the recording region in the boundary between the physical header region and the recording region. The pulse train duration counter 801 starts measuring the time Top upon the detection of the pulse or the pulse train appearing in the shaping signal L0. As the threshold Tr has passed since the pulse train detected last time stops appearing at the time of starting the measurement, the pulse train duration time counter 801 is reset. When the time Top exceeds the threshold Tw, the pulse train duration counter 801 notifies the header evaluation sequencer 803. When the header evaluation sequencer 803 receives the notification from the pulse train duration counter 801 in the state 4, the header evaluation sequencer 803 evaluates that the end of the physical header region is detected, and the internal state transitions to the state S5.

However, in the state S4, when the elapsed time Th measured by the header length protection counter 804 exceeds the threshold Te2 that corresponds to the length of the entire physical header region, the header evaluation sequencer 803 receives from the header length protection counter 804 the notification (the detection timeout notification of the header region) indicating that the detection time is out. When the header evaluation sequencer 803 receives the detection timeout notification of the header region, the header evaluation sequencer 803 forces the internal state to transition to the state S5 without waiting for the notification that the time Top exceeds the threshold Tw indicating that the end of the physical header region is detected. As the operation after the internal state transitions to the state S5 is similar to the case when the internal state transitions from the state 1 or 3 to the state 5, the explanation is omitted.

As explained above, the state S1 and S2 are the states when the first pulse is detected, and when there is no error in the detection, the pulse train corresponding to the first part of the physical header region is detected. Moreover, the state S3 and S4 are the states when the second pulse with the polarity different from that of the secondly detected first pulse is detected, and when there is no error in the detection, the pulse train corresponding to the second part of the physical header region is detected in the states S3 and S4. Further, the state S5 and the initial state S0 are the states when the pulse or the pulse sequence corresponding to the recording region is detected or an error occurs in the detection of the pulse or pulse train of the physical header region.

The physical header detection sequencer 8 generates and outputs each signal in the following way according to the aforementioned transition of the internal state. The header evaluation sequencer 803 sets the OPID detection signal, which indicates that the offset part to the outer circumference of the physical header is detected, to the level "1" in the states S2 and S3 and to the level "0" in other states and outputs the OPID detection signal. Moreover, the header evaluation sequencer 803 sets the IPID detection signal, which indicates that the offset part to the inner circumference is detected, to the level "1" in the states S1 and S4 and to the level "0" in other states and outputs the IPID detection signal. In addition, the header evaluation sequencer 803 sets the passband control signal to the level "1" indicating to reduce the cutoff frequency in the states S1 and S2 and to the level "0" in other states and outputs the passband control signal.

When the IPID detection signal transitions from the level "1" to the level "0" and the OPID detection signal transitions from the level "0" to the level "1" (from the state S1 to the state S3), the land/groove evaluation unit 821 sets the groove detection signal to the level "0". On the other hand, when the OPID detection signal transitions from the level "1" to the level "0" and also the IPID detection signal transitions from the level "0" to the level "1" (from the state S2 to the state S4), the land/groove evaluation unit 821 sets the groove detection signal to the level "1". The land/groove evaluation unit 821 maintains the state held by the groove detection signal in the transitions other than the above transition.

Next, the operation is explained using operational waveforms of each unit in the optical disc apparatus 100.

Figure 4:
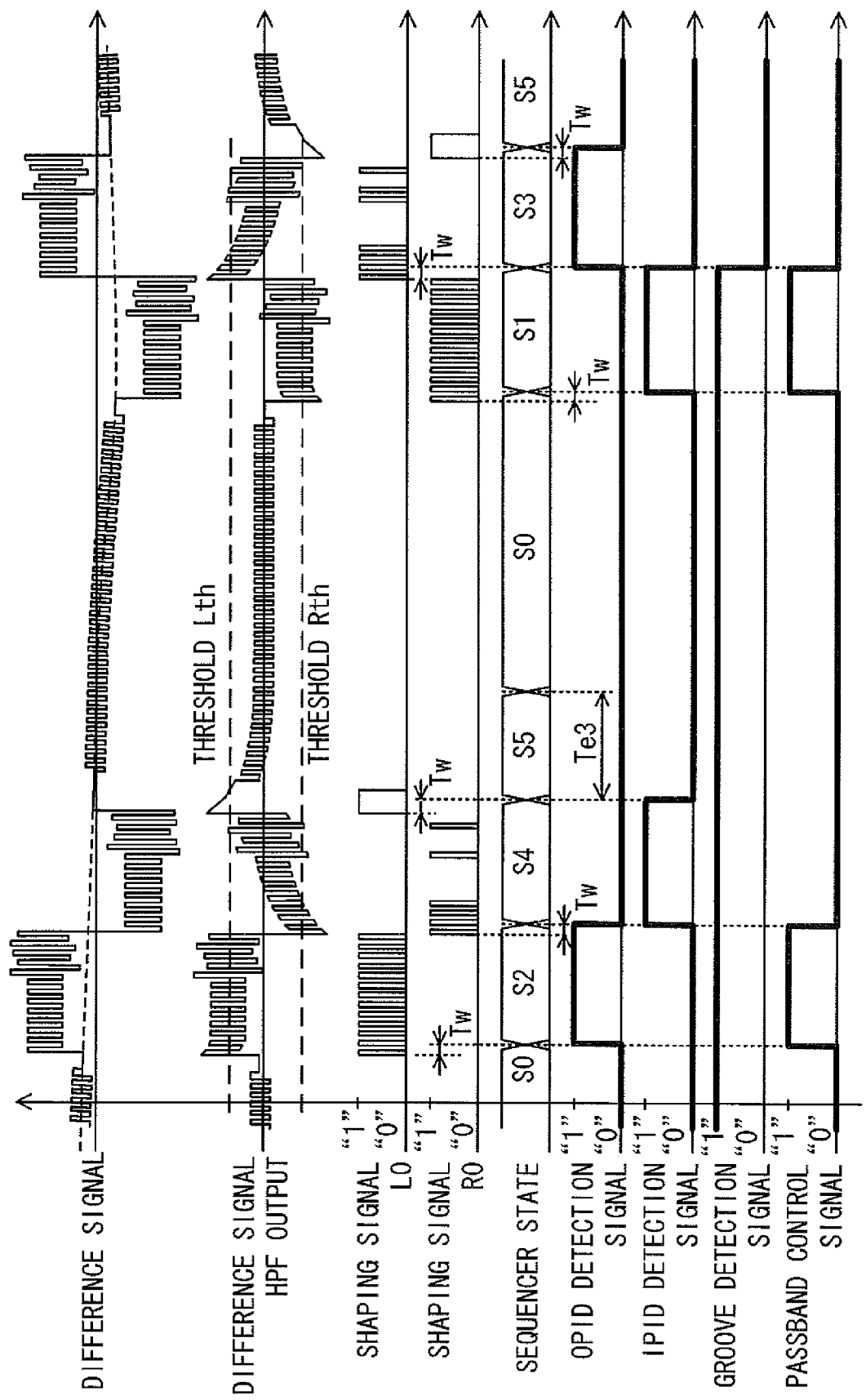
FIG. 4 is a diagram showing an example of signal waveforms of each unit according to the first embodiment.

FIG. 4 is an example of operational waveforms of each unit in the optical disc apparatus 100 according to the first embodiment. The difference signal is obtained as a waveform with an offset in a reversed polarity applied in each of the first and second parts of the physical header region. In addition, although not explicitly shown in FIG. 12, low frequency offset fluctuation caused by a tracking error in the tracking is superimposed on the difference signal. Further, when there is a defect that disturbs the tracking servo in the optical disc 1 or when an external shock is applied to the optical disc 1, larger offset fluctuation appears in the difference signal.

The optical disc apparatus 100 can obtain the difference signal HPF output with the low frequency component removed by passing the difference signal with such offset fluctuation through the high pass filter 6. In DVD-RAM, the physical header region has the length for about 2000 channel bits. Setting the cutoff frequency at the time when the passband control signal is the level "0" to about $1/1000$ (about fc/1000) of a channel clock frequency fc, the low frequency component having a cycle longer than or equal to the length of the physical header region can be removed from the difference signal.

As the difference signal HPF output takes a value close enough to zero in the latter half of the recording region, an offset amount of the beginning of the physical header region is not influenced by the low frequency component but is generally determined depending on an amount of stepped change between the recording region and the header beginning. As the thresholds Lth and Rth can be set according to the amount of stepped change, the thresholds Lth and Rth are not susceptible to the influence of the low frequency component caused by a defect and unstable tracking servo, thereby achieving stable pulsing.

When the pulse train appears in the shaping signal L0 near the beginning of the physical header region, and the pulse train duration Tip exceeds the threshold Tw, the header evaluation sequencer 803 makes the internal state transition from the initial state S0 to the state S2. In the state S2, the header evaluation sequencer 803 changes the passband control signal to the level "1" while changing the OPID detection signal to the level "1". When the passband control signal is the level "1", the cutoff frequency of the high pass filter 6 is reduced to about fc/10000 or less. Therefore, a stepped offset that appears while outputting the difference signal HPF output in the beginning (the beginning of the first part) of the physical header region is hardly reduced.

Next, when a stepped negative change appears in the difference signal in the latter half (the second part) of the physical header region, the pulse train appears in the shaping signal R0. When the pulse train duration in the shaping signal R0 exceeds the threshold Tw in the state S2, the header evaluation sequencer 803 makes the internal state transition to the state S4 and switches the OPID detection signal to the level "0", the IPID detection signal to the level "1", and the passband control signal to the level "0".

Moreover, the land/groove evaluation unit 821 detects that the physical header region shifts from the positive polarity to the negative polarity based on the OPID detection signal and the IPID detection signal. In addition, the land/groove evaluation unit 821 evaluates that the recording sector is on the groove track based on the detection result and sets the groove detection signal to the level "1". As FIG. 4 indicates the case when the groove detection signal holds the level "1", the level "1" is maintained.

Switching the passband control signal to the level "0" allows the high pass filter 6 to return (increase) the reduced cutoff frequency. Then, the offset in the difference HPF output gradually approaches to zero in the second part of the physical header region, and the pulse train hardly appears in the shaping signal R0. After that, a stepped offset change in the difference signal accompanying the shift from the physical header region to the recording region leads to an offset appearing in the difference signal HPF output and a pulse to be output to the shaping signal L0. This pulse may be a plurality of pulse trains by the influence of disturbance included in the difference signal. When the duration of the pulse or the pulse train exceeds the threshold Tw, the header evaluation sequencer 803 makes the internal state transition to the state S5. Further, the false detection protection counter 805 makes the internal state transition to the initial state S0 after an elapse of the certain time Te3 since the transition to the state S5 in order to protect the optical disc 1 from false detection.

This applies to the case when the offset in the beginning of the physical header region (the beginning of the first part) is negative. Firstly, the header evaluation sequencer 803 makes the internal state transition from the initial state S0 to the state S1 when the pulse train duration Tip in the shaping signal R0 exceeds the threshold Tw. Next, the header evaluation sequencer 803 makes the internal state transition to the state S3 when the pulse train duration in the shaping signal L0 exceeds the threshold Tw. As the passband control signal is the level "1" in the state S1, the offset in the difference signal HPF output is held and the state where the pulse train easily appears continues. On the other hand, in the state S3, the passband control signal is switched to the level "0", and gradually, the pulse train in the shaping signal L0 will hardly appear in the second part of the physical header region. Lastly, the header evaluation sequencer 803 makes the internal state transition to the state S5 by the pulse appearing in the shaping signal R0 at the beginning of the recording region. Further, the false detection protection counter 805 operates to return the internal state to the initial state S0 after an elapse of the certain time Te3 since the transition to the state S5 in order to protect the optical disc 1 from false detection. At the time of the transition from the state S1 to the state S3, it is determined that the recording sector is on the land track, and the groove detection signal is switched to the level "0".

Figure 5:
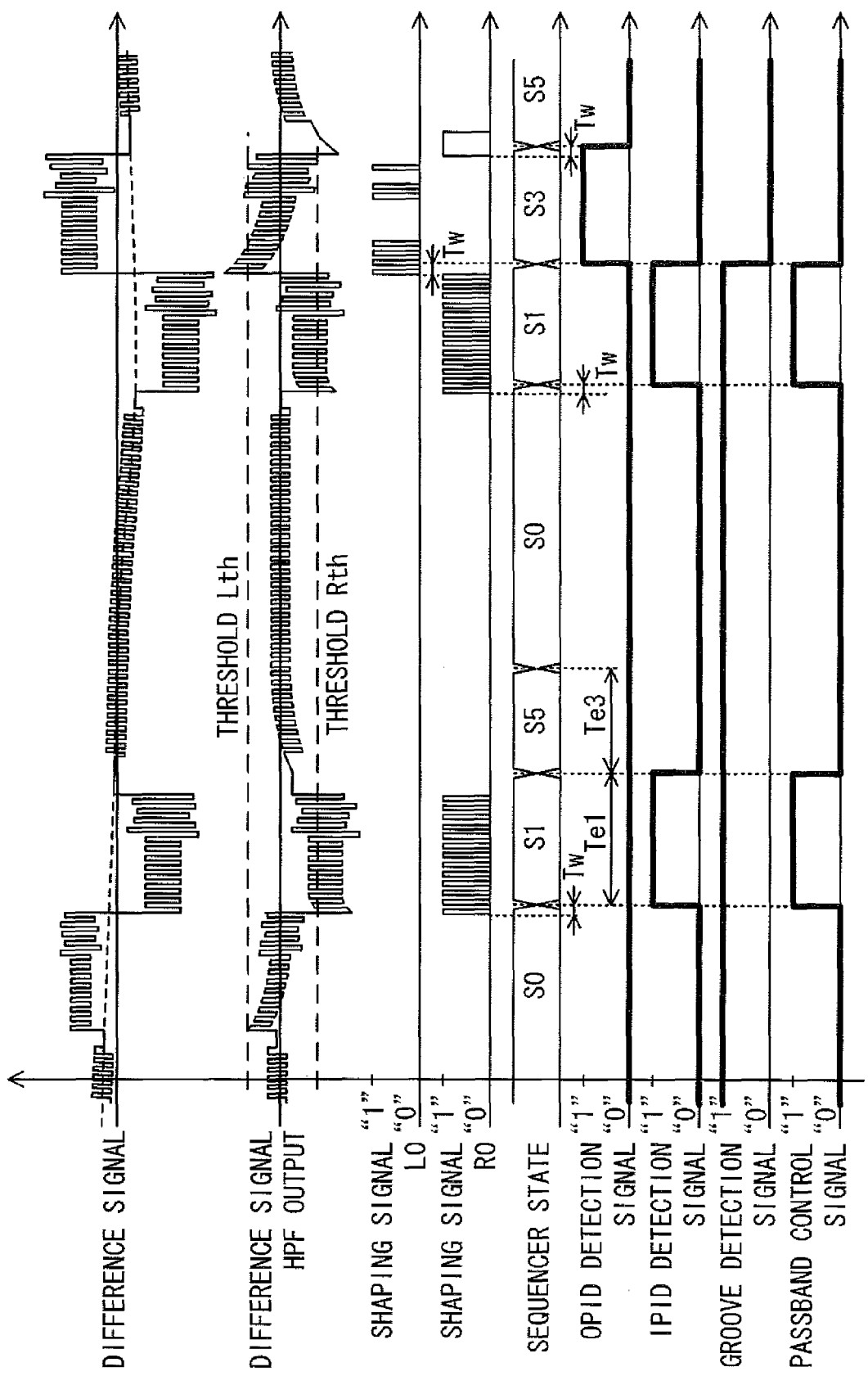
FIG. 5 is a diagram showing an example of signal waveforms of each unit when a mistake occurs in detecting a pulse train.

Next, an operation when there is a failure to detect a pulse train in the beginning of the physical header region is explained with reference to FIG. 5. Since the low frequency offset fluctuation is removed by the high pass filter in the difference signal HPF output, there is a few chances of incorrect pulsing by the difference signal shaping unit. However when an amplitude of the difference signal is small in the beginning of the physical header region, the difference signal HPF output does not exceed the thresholds Lth and Rth and the pulse train may stop appearing in the shaping signal L0 or R0. Even in such a case, there is a demand for the header evaluation process not to fail. Since the cutoff frequency of the high pass filter is maintained to be high when the pulse train does not appear in the shaping signal L0, the offset in the difference signal HPF output changes to approach to zero even in the first half of the physical header region. After that, at the time when the pulse train appears in the shaping signal R0 by the stepped change appearing in the latter half of the physical header region, the physical header detection sequencer recognizes the physical header region for the first time and makes the internal state transition from the initial state S0 to the state S1.

As the passband control signal is switched to the level "1" in the state S1, the offset in the difference signal HPF output does not largely change but a large negative offset is maintained. The stepped offset change at the time of the shift from the physical header region to the recording region is smaller than the offset change at the time of shift from the first half to the latter half of the header. Thus the pulse train does not appear in the shaping signal L0 even at the beginning of the recording region, and the sequencer makes the internal state transition to the state S5 when the elapsed time Th since the transition to the state S1 exceeds the threshold Te1 corresponding to the length of the first half of the physical header region.

As the passband control signal is switched to the level "0" accompanying the transition to the state S5, the cutoff frequency of the passband filter is maintained to be high in the recording region. Moreover, when an error occurs in the detection of the pulse train in the beginning of the physical header region in this way, the internal state will not transition from the state S1 to the state S3, thereby eliminating false evaluation of the recording region as the land track and maintaining the same polarity as the last recording region. In DVD-RAM, within the physical header region for dozens of recording sectors per revolution of the optical disc, there is only one recording sector for switching the land track and the groove track. Thus holding the same polarity as the last recording region maintains the probability of incorrect tracking polarity to be low even upon a mistake in detecting the physical header region.

As explained above, in this embodiment, it is possible to realize an evaluation method that leads to less false evaluation of the land and groove tracks while being less susceptible to the influence of a defect and recorded data and correctly detecting the physical header region even immediately after the seek operation.

Second Embodiment

Figure 6:
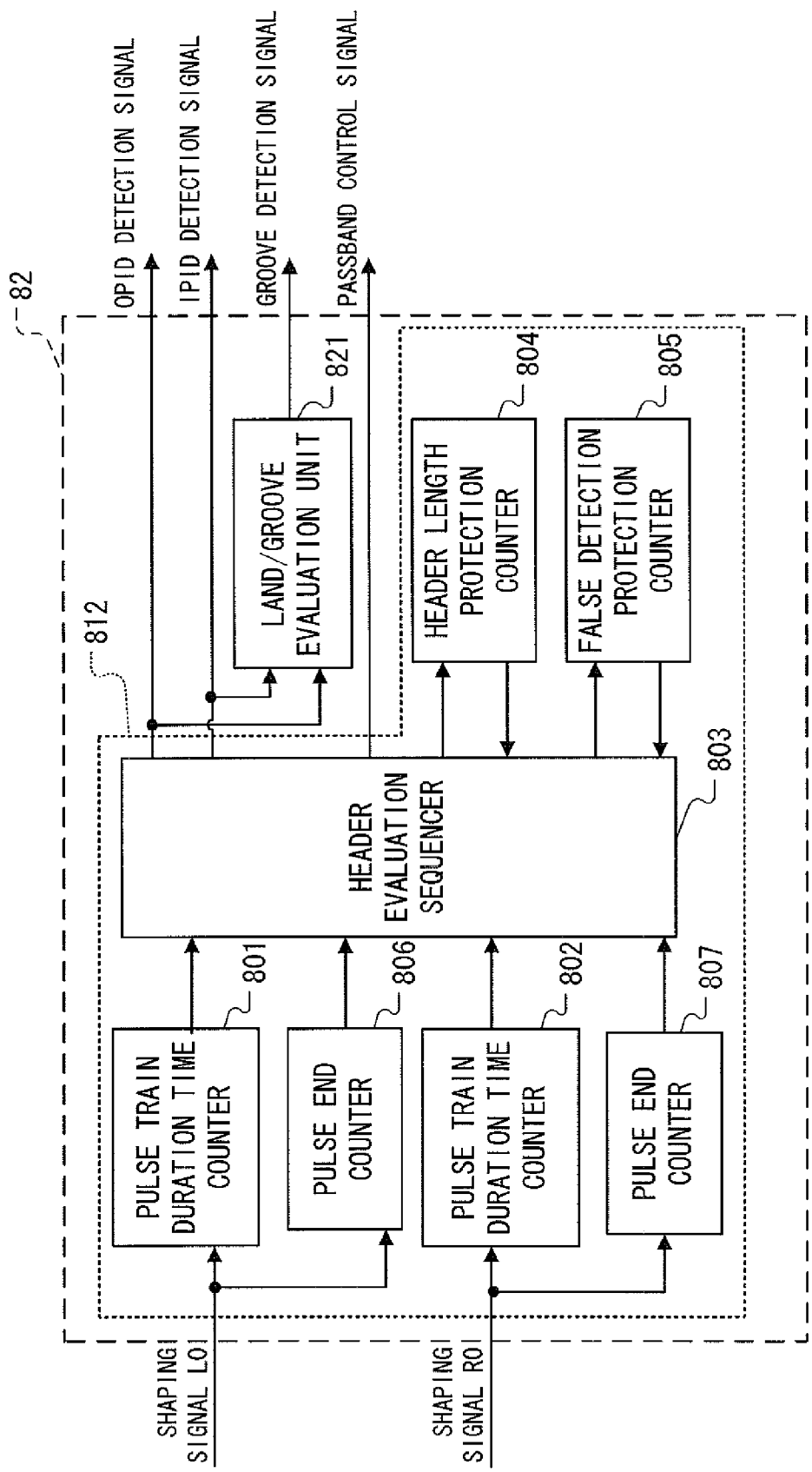
FIG. 6 is a diagram showing a configuration example of a physical header detection sequencer according to a second embodiment.

Next, an optical disc apparatus according to a second embodiment is explained. Since the block diagram of the apparatus is similar to the one in the first embodiment, the explanation is omitted. FIG. 6 shows a configuration of a physical header detection sequencer 82 used in the second embodiment. The header evaluation unit 812 further includes pulse end counters 806 and 807 in addition to the header evaluation unit 811 shown in FIG. 2. Since the components with the same reference numerals are similar to those in the first embodiment, the explanation is omitted.

This embodiment explains an aspect of adding a period to reduce the cutoff frequency of the high pass filter 6 in addition to the first embodiment. Specifically, this embodiment explains the case in which the header evaluation unit 812 controls the cutoff frequency of the high pass filter 6 to be reduced in the period from recognition that the first region of the physical header region is detected until recognition that the boundary (the end of the physical header region) between the physical header region and the recording region is detected. Therefore, in this embodiment, the header evaluation unit 812 generates the passband control signal for controlling the cutoff frequency of the high pass filter 6 to be reduced also in the period of the states 3 and 4 in addition to the control in the first embodiment to reduce the cutoff frequency in the period of the states 1 and 2.

The pulse end counter (a first pulse end counter) 806 measures elapsed time Toz (hereinafter may also be referred to as "pulse non-detected time Toz" or "time Toz") since the pulse train stops appearing in the shaping signal L0 and notifies the header evaluation sequencer 803 when the pulse non-detected time Toz exceeds a predetermined threshold Tz. In a similar manner as the pulse termination counter 806, the pulse termination counter (a second pulse termination counter) 807 measures elapsed time Tiz (hereinafter may also be referred to as "pulse non-detected time Tiz" or "time Tiz") since the pulse sequence stops appearing in the shaping signal R0 and notifies the header evaluation sequencer 803 when the pulse non-detected time Toz exceeds the predetermined threshold Tz.

The threshold Tz is a threshold (a pulse non-detected elapsed time threshold) of the elapsed time since the pulse or the pulse train is not detected, and a period corresponding to the length of the second part is set to the threshold Tz, for example. The pulse end counters 806 and 807 hold the threshold Tz.

In the physical header detection sequencer 82 of FIG. 6, the shaping signals L0 and R0 are respectively input to the pulse train duration counters 801 and 802 in a similar manner as the first embodiment and also input to the pulse end counters 806 and 807.

The pulse train duration counters 801 and 802 measure the time when the pulse train appears in each of the shaping signals L0 and R0 and notifies the header evaluation sequencer 803 that the threshold Tw has been exceeded.

The pulse end counters 806 and 807 measure the elapsed time Toz and Tiz since the pulse train stops appearing in each of the shaping signals L0 and R0 and notifies the header evaluation sequencer 803 when the elapsed time exceeds the predetermined threshold Tz. Values of the counters held by the pulse end counters 806 and 807 are initialized at the time of the transition to the initial state S0 in addition to when the pulse appears in each of the shaping signals L0 and R0.

In a similar manner as the first embodiment, the header length protection counter 804 measures the elapsed time since the internal state in the header evaluation sequencer 803 transitions from the initial state S0 to the state S1 or the state S2 and notifies the header evaluation sequencer 803 when the elapsed time exceeds the threshold Te1 corresponding to the length of the first part of the physical header region and when the elapsed time exceeds the threshold Te2 corresponding to the entire length of the physical header region.

The false detection protection counter 805 measures the elapsed time since the transition to the state S5 in the header evaluation sequencer 803 and notifies the header evaluation sequencer 803 when the certain time Te for false detection protection has passed.

Figure 7:
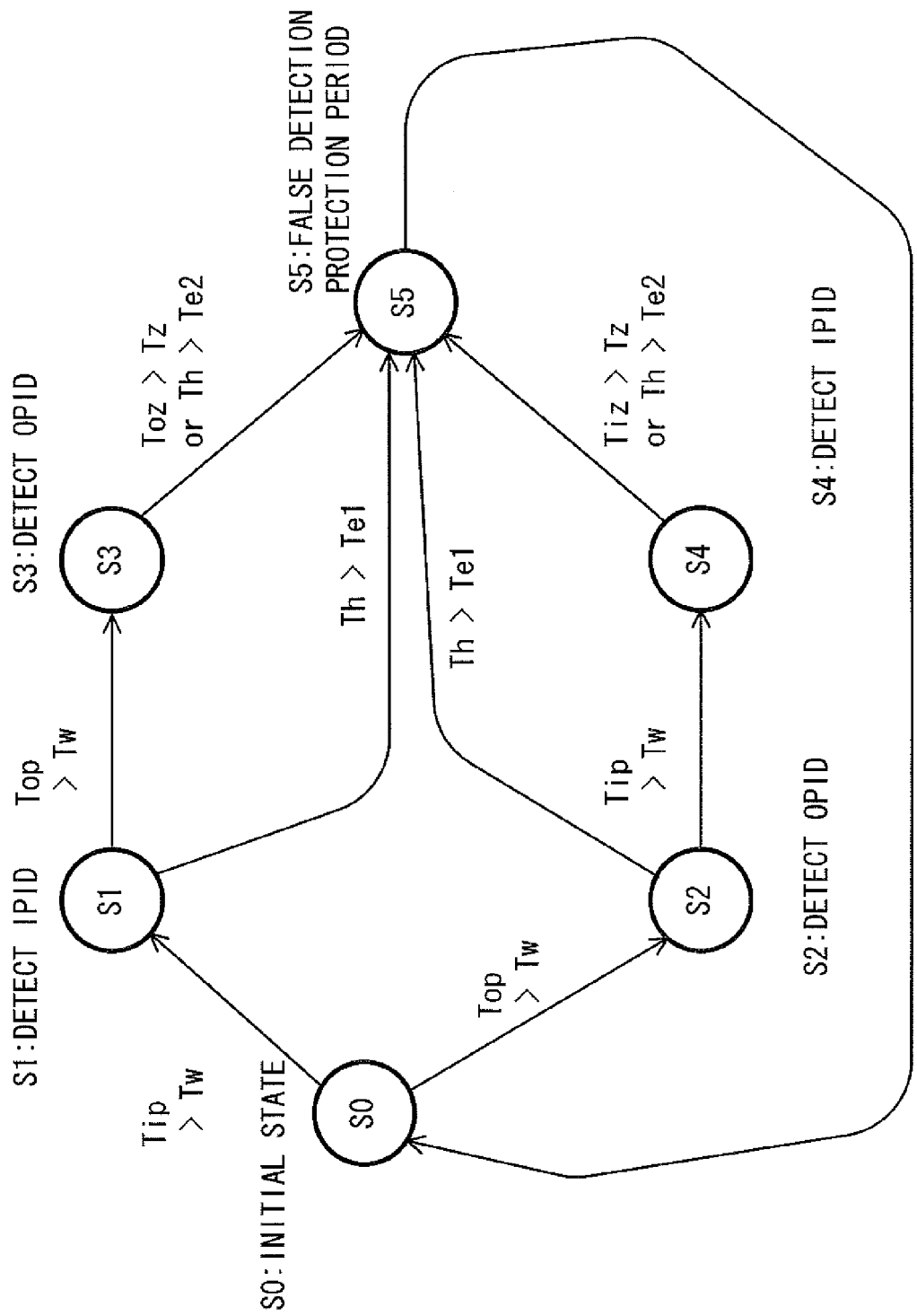
FIG. 7 is a diagram showing an example of a state transition of a header evaluation sequencer according to the second embodiment.
Figure 8:
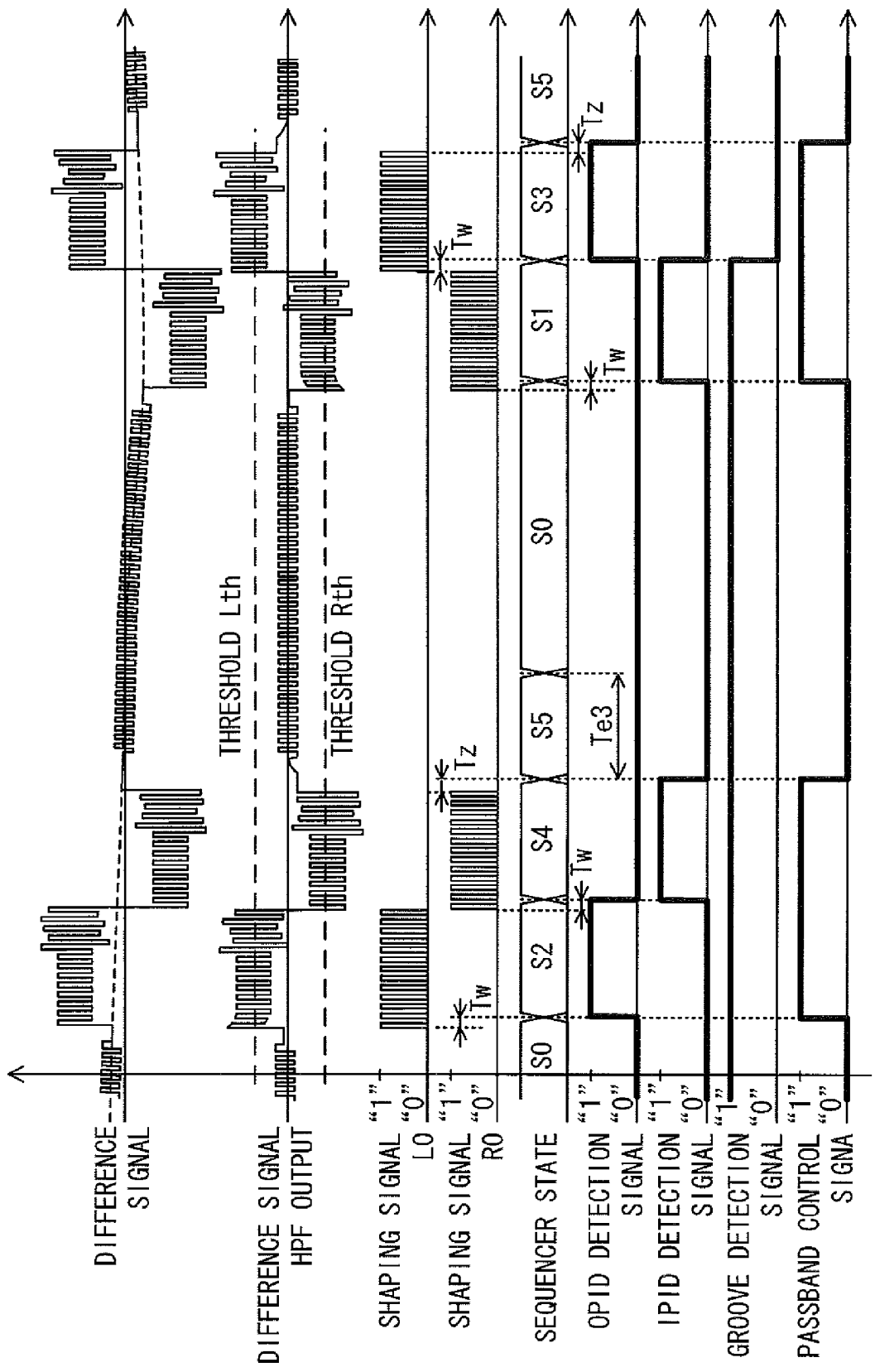
FIG. 8 is a diagram showing an example of signal waveforms of each unit according to the second embodiment.

FIG. 7 shows a state transition diagram of the header evaluation sequencer used in the second embodiment, and FIG. 8 shows operation waveforms of each unit.

In a similar manner as the first embodiment, there are six states from the initial state S1 to the state S5 for the internal state of the header evaluation sequencer 803. However this embodiment is different from the first embodiment in the point that the passband control signal is set to the level "1" even in the states S3 and S4.

When the header evaluation sequencer 803 receives the notification that the pulse train in the shaping signal L0 exceeds the threshold Tw from the pulse train duration time counter 801 in the initial state S0, the header evaluation sequencer 803 makes the internal state transition to the state S2. In the state S2, while the OPID detection signal is switched to the level "1", the passband control signal is also switched to "1", and the cutoff frequency of the high pass filter is reduced. Further, the passband control signal is maintained to the level "1" even when the pulse train duration in the shaping signal R0 exceeds the threshold Tw, and the internal state transitions to the state S4. Then, the stepped offset change is reflected in the physical header region also in the difference signal HPF output.

As the offset in the difference signal HPF output does not approach to zero even in the second part of the physical header region, the pulse train in the shaping signal R0 continues to the end of the physical header region. The pulse end counter 807 notifies the header evaluation sequencer 803 that the elapsed time Tiz since the pulse train in the shaping signal R0 has ended exceeded the threshold Tz, and the header evaluation sequencer 803 makes the internal state transition to the state S5. Then, the header evaluation sequencer 803 receives from the false detection protection counter 805 the notification that the elapsed time since the transition to the state S5 exceeds the certain time Te3 and makes the internal state return to the initial state S0.

This also applies to the case when the internal state transitions through the states S1 and S3. Specifically, the internal state sequentially transitions by detecting that the pulse train duration in the shaping signals R0 and L0 has exceeded the thresholds and the pulse train in the shaping signal L0 has ended. In a similar manner as the first embodiment, the internal state transitions to the state S5 by the notification from the header length protection counter 804. Further, the internal state transitions to the state S5 by the notification that the elapsed time exceeds the threshold Te2 in the states S3 and S4.

In a similar manner as the first embodiment, the groove detection signal is also set to the level "1" and the level "0" respectively at the time of the transition from the state S2 to the state S4 and the transition from the state S1 to the state S3.

Also in the second embodiment, the cutoff frequency of the high pass filter 6 is maintained to be high. This removes the low frequency component in the difference signal and is expected to reduce the false detection and a failure to detect the shaping signal in the physical header region.

Third Embodiment

Figure 9:
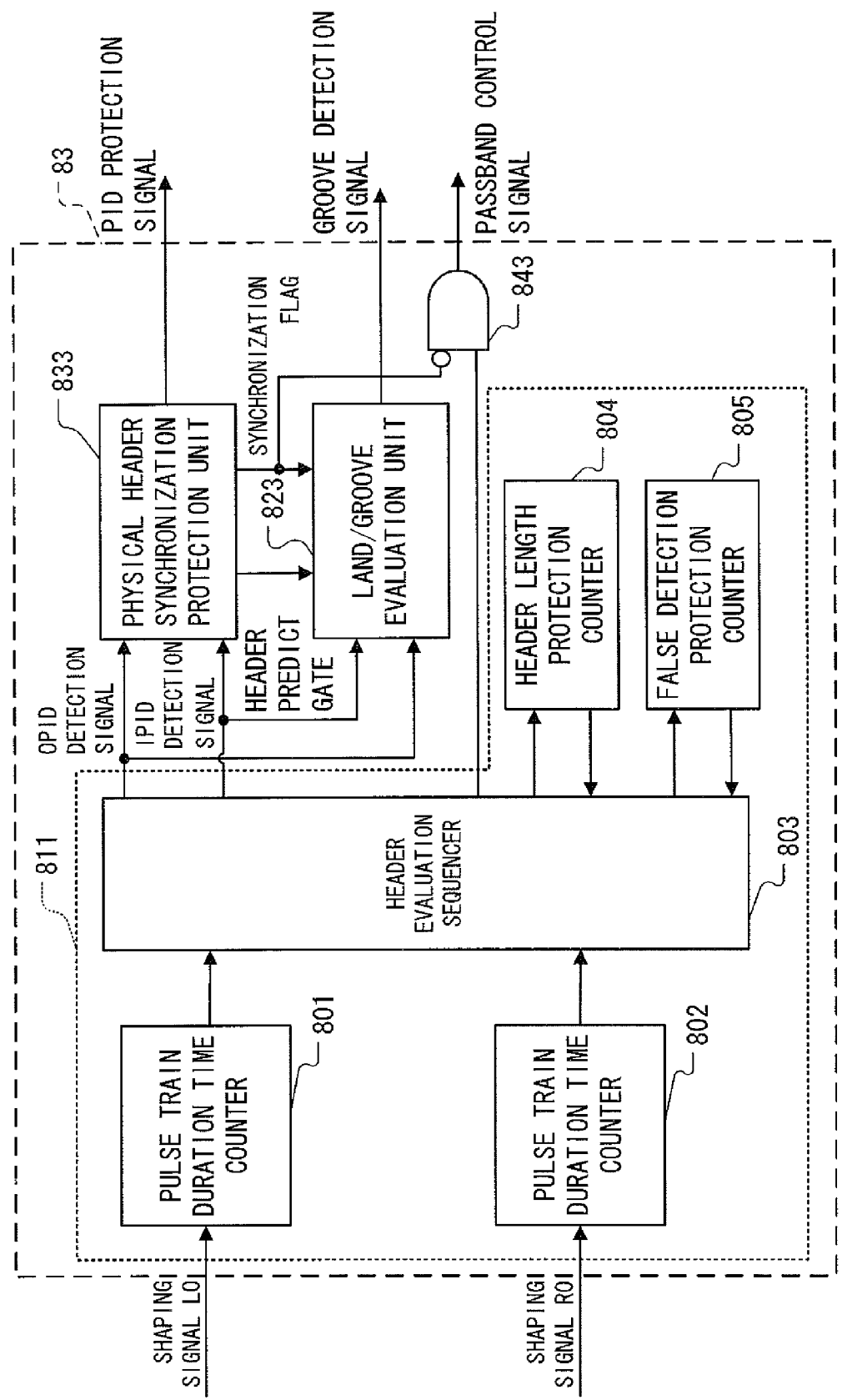
FIG. 9 is a diagram showing a configuration example of a physical header detection sequencer according to a third embodiment.

FIG. 9 shows a block diagram of a physical header detection sequencer according to a third embodiment. The explanation for the common components with the first embodiment is omitted, and differences are focused here. A physical header detection sequencer 83 shown in FIG. 9 further includes a physical header synchronization protection unit 833 and an AND gate 843 in addition to the physical header detection sequencer 8 in FIG. 1, and a land/groove evaluation unit 823 has a different function from the first embodiment.

This embodiment explains an aspect in which the physical header region is provided at the beginning of the recording sector separated by the same length on the optical disc, and the physical header regions appear at regular intervals during the normal recording and reproducing operation. Specifically, when the physical header detection sequencer 83 succeeds to detect the physical header region for a predetermined number of times, the physical header detection sequencer 83 evaluates that the synchronization has been established, predicts that the physical header regions appear at almost the same cycle, and complements the case when the physical header region cannot be detected.

In addition, a signal, which is switched to the level "1" when the internal state of the header evaluation sequencer 803 is the state S1 or the state S2 and masked through the AND gate 843, is used as the passband control signal instead of directly using a signal generated by decoding the internal state of the header evaluation sequencer 803 as the passband control signal to be input to the high pass filter 6. A synchronization flag output from the physical header synchronization protection unit 833 is inverted and supplied to the other input terminal of the AND gate 843.

The physical header synchronization protection unit 833 receives the IPID detection signal and the OPID detection signal from the header evaluation sequencer 803 and outputs a PID protection signal, the synchronization flag, and a header prediction gate (a header prediction signal).

The PID protection signal is a signal representing a logical sum of the IPID detection signal and the OPID detection signal that is provided with synchronization protection of a sector cycle. In other words, the PID protection signal is a signal with lacking part complemented using that the IPID detection signal and the OPID detection signal appear at the same cycle as a sector interval.

The synchronization flag indicates a synchronous state in which the detection of the physical header region has succeeded for the predetermined number of time. The predetermined number of time is previously set and held by the physical header synchronization protection unit 833. The header prediction gate is a signal indicating a predicted position of the physical header region. The header prediction gate is generated based on the past detection result of the physical header region.

The information reproduction unit 9 and the address reproduction unit 10 receive the binarized data output from the reproduction signal processing unit 5 and the PID protection signal and respectively outputs the reproduced data, the address information, and the like. The information reproduction unit 9 and the address reproduction unit 10 determine whether it is the data recording region or the physical header region by the PID protection signal, and in a similar manner as the case of using the IPID detection signal and the OPID detection signal, reproduces the information, address, and the like.

Therefore, the physical header synchronization protection unit 833 generates the PID protection signal in the similar manner as the OPID detection signal and the IPID detection signal that are input to the information reproduction unit 9 and the address reproduction unit 10. For example, when each of the OPID detection signal and the IPID detection signal are input, the physical header synchronization protection unit 833 generates two signals corresponding to the OPID detection signal and the IPID detection signal as the PID protection signal. On the other hand, when a logical sum signal of the OPID detection signal and the IPID detection signal is input, the physical header synchronization protection unit 833 generates one signal corresponding to the logical sum signal as the PID protection signal. Following explanation shows the case of generating a signal corresponding to the logical sum signal of the OPID detection signal and the IPID detection signal as the PID protection signal, for example.

The physical header synchronization protection unit 833 sets the synchronization flag in the initial state S0 to the level "0", generates the logical sum signal of the IPID detection signal and the OPID detection signal as the PID protection signal, and outputs the synchronization flag and the PID protection signal. The physical header synchronization protection unit 833 switches the synchronization flag to the level "1" when pulses of the IPID detection signal and the OPID detection signal are continuously input for a predetermined number of times or more in the same cycle as the length of the recording sector. In addition, the physical header synchronization protection unit 833 switches the header prediction gate to the level "1" at the beginning of the next physical header region and to the level "0" at the end of the physical header region based on the timing obtained from the IPID detection signal and the OPID detection signal of the preceding recording sector.

The physical header synchronization protection unit 833 continues to periodically output pulses as the PID protection signal based on the predicted timing from the preceding recording sector while the synchronization flag is the level "1".

On the other hand, when the IPID detection signal and the OPID detection signal are continuously missing for a predetermined number of times or an input pulse appears at a different timing from the predicted timing, the physical header synchronization protection unit 833 returns the synchronization flag to the level "0" and waits for the pulses of the IPID detection signal and the OPID detection signal to appear again in the same cycle as the length of the recording sector.

The land/groove evaluation unit 823 receives the IPID detection signal, the OPID detection signal, the header prediction gate, and the synchronization flag and outputs the groove detection signal.

When the synchronization flag is the level "0", the land/groove evaluation unit 823 switches the groove detection signal according to the order in which the pulses of the IPID detection signal and the OPID detection signal appear. Specifically, the land/groove evaluation unit 823 switches the groove detection signal to the level "1" when the pulse appears in the IPID detection signal following the pulse in the OPID detection signal, whereas the land/groove evaluation unit 823 switches the groove detection signal to the level "0" when the pulse appears in the OPID detection signal following the pulse in the IPID detection signal. In addition, when the pulses in the IPID detection signal and OPID detection signal do not appear continuously, the land/groove evaluation unit 823 maintains the groove detection signal to the last value. The groove detection signal obtained in this case is the same as the one in the first embodiment.

When the synchronization flag is the level "1", the operation of the land/groove evaluation unit 823 for switching the groove detection signal according to the order in which the pulses in the IPID detection signal and the OPID detection signal appear is similar to the case when the synchronization flag is the level "0". In addition, in the case where the pulse appears independently in the IPID detection signal or the OPID detection signal when the synchronization flag is the level "1" (i.e., the pulse appears in only one of the IPID detection signal and the OPID detection signal), the land/groove evaluation unit 823 updates the groove detection signal according to the position from the header prediction gate. Specifically, when the pulse of the IPID detection signal appears independently, the land/groove evaluation unit 823 switches the groove detection signal to the level "0" when the position where the pulse appears is in the first half (the first part) of the period while the header prediction gate is the level "1" and switches the groove detection signal to the level "1" when the position where the pulse appears is in the latter half (second part) of the period while the header prediction gate is the level "1". On the other hand, when the header prediction gate appears in the period when the header prediction gate is the level "0", the land/groove evaluation unit 823 maintains the groove detection signal to the last value. Similarly, in the case where the pulse of the OPID detection signal appears in the first half period when the header prediction gate is the level "1", the land/groove evaluation unit 823 switches the groove detection signal to the level "1". Meanwhile, in the case where the pulse of the OPID detection signal appears in the latter half period when the header prediction gate is "1", the land/groove evaluation unit 823 switches the groove detection signal to the level "0".

This operation enables correct evaluation of the land track and the groove track even when there is a failure to detect the pulse train in the shaping signal L0 and R0, and the OPID detection signal and the IPID detection signal are missing. The land/groove evaluation unit 823 makes it possible by the synchronization flag to compensate the case when the OPID detection signal and the IPID detection signal are missing.

Figure 10:
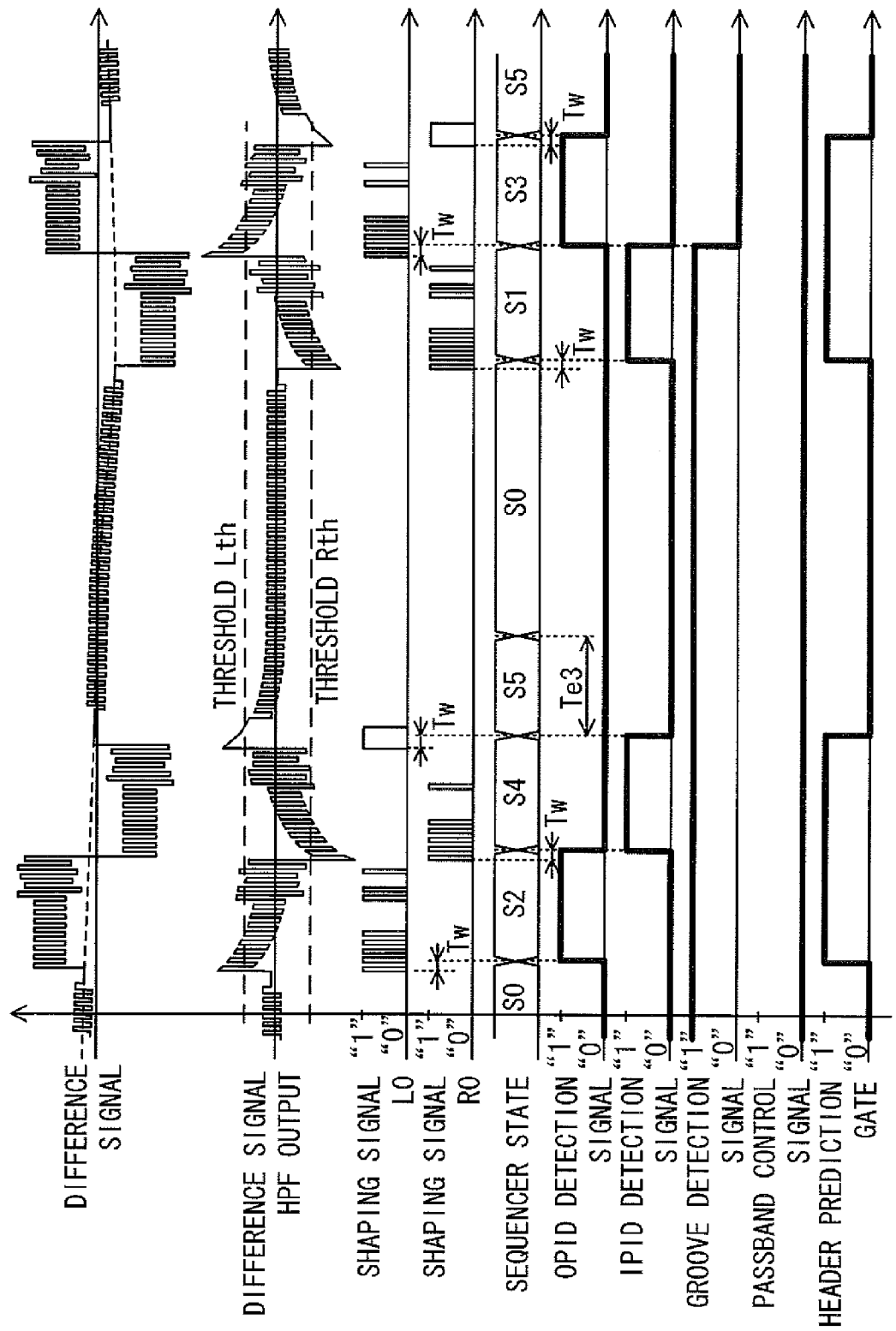
FIG. 10 is a diagram showing an example of signal waveforms of each unit according to the third embodiment.

In the physical header detection sequencer 83 shown in FIG. 9, when the synchronization flag indicates the synchronous state, the physical header detection sequencer 83 generates the passband control signal for controlling the cutoff frequency of the high pass filter not to be reduced. Meanwhile, when the synchronization flag indicates the asynchronous state, the physical header detection sequencer 83 generates the passband control signal for controlling the cutoff frequency of the high pass filter to be reduced for the difference signal corresponding to at least a part of the physical header region according to the detection result of the physical header region. Specifically, the physical header detection sequencer 83 includes the AND gate 843 that masks the passband control signal by the synchronization flag. The pulse same as the passband control signal output from the physical header detection sequencer 8 appears in the passband control signal in the period when the synchronization flag is the level "0". Therefore, the waveforms of the difference signal HPF output and the shaping signals L0 and R0 will be similar to the ones in the first embodiment shown in FIG. 4. On the other hand, the passband control signal is the level "0" at anytime when the synchronization flag is the level "1". For this reason, the cutoff frequency will not be reduced. The waveforms of each unit at this time are shown in FIG. 10.

Since the passband control signal is maintained to the level "0", the offset in the difference signal HPF output will have a waveform approaching to zero at a certain time constant determined by the cutoff frequency. In the shaping signals L0 and R0, the pulse train starts appearing according to the phased steps appearing in the beginning, middle, and end of the physical header region and the pulse train gradually stops appearing. The physical header detection sequencer 83 measures the duration of the pulse train in response to the pulse train appearing immediately after the step, and the internal state is updated when the duration exceeds the threshold Tw. When the pulse train does not appear in the shaping signals L0 and R0 due to a defect and the like, the OPID detection signal and the IPID detection signal will be missing. However the groove detection signal generated by a positional relationship with the header prediction gate that is generated from the prediction of the preceding recording sector prevents false evaluation.

Such a configuration example switches the passband in priority to the detection performance immediately after the seek operation where the prediction by the preceding recording sector does not work, and thereby achieving an effect of minimizing the noise in the difference signal by the false detection after the synchronization is established. This embodiment is same as the first embodiment in the point that the cutoff frequency is set to be high in the recording region immediately after the seek operation to remove the offset fluctuation appearing due to a defect of the seek operation and the cutoff frequency is reduced in the physical header region, thereby ensuring stability of pulse train detection.

Further, when the physical header regions are periodically detected across multiple recording sectors, it is evaluated that the synchronization is established, and the synchronization flag is changed to the level "1". As a result, the passband control signal is masked by the synchronization flag, and the cutoff frequency of the high pass filter is maintained to be high at any time. This enables short-time recovery of the offset in the difference signal HPF output even when a serious disturbance exceeding the threshold appears in the data region. After the synchronization flag is changed to the level "1", detection stability of the pulse train in the header region is slightly lost. However as the physical header synchronization protection unit 833 starts the prediction operation at the same time, it is possible to avoid undesirable effects accompanying the failure to detect the shaping pulse trains.

As the continuity is interrupted before and after the seek operation and due to off-tracking, usually a timing when the physical header regions are continuously detected for some times in the same cycle as a sector length is used for the timing to evaluate the establishment of the synchronization. After that, even upon a mistake in the detection, prediction is made based on the timings detected so far, a detection pulse estimated to be missing is complemented, and the PID protection signal is output.

However, it is necessary to avoid continuous output of complemented detected pulses when the timing is completely different due to the seek operation, noise in the tracking, and the like. Therefore, upon continuous detection mistakes for several times at the predicted timings, the synchronization flag is changed to the level "0", the header prediction gate will not complement the groove detection signal, and the process to establish the synchronization again is performed.

The number of detection to evaluate that the synchronization is established or the number of detection mistakes to evaluate out-of-synchronization may be reduced depending on the quality of the optical disc for example to reduce the allowable limit of the detection mistake or the processing time. Therefore, in the semiconductor integrated circuit, it is desirable that the number of detection until the synchronization is established is programmable to be changeable after operation. In addition, the optical disc apparatus may perform a process to change the number of detection until synchronization evaluation or out-of-synchronization evaluation at the time of rereading data in the unreadable region.

Note that this embodiment explained an example of using the sequencer similar to the one in the first embodiment as the physical header detection sequencer used in the third embodiment. However, it is obvious that similar effects can be obtained when the physical header detection sequencer according to the second embodiment, the physical header synchronization protection unit 833 explained in the third embodiment, and the land/groove evaluation unit are used together.

Other Embodiments

Each of the aforementioned embodiment explained that a fixed value is used for the thresholds Lth and Rth for pulsing by the waveform shaping unit 7. However, a value generated by adding or subtracting a certain offset to or from a peak detection value or a bottom detection value of the difference signal HPF output in the recording region may be employed as the thresholds. Since the low frequency offset fluctuation component is removed by the high pass filter, there is little fluctuation in the peak detection value or the bottom detection value of the difference signal HPF output. However, as a value generated by adding a certain offset to the peak detection value is used as the threshold Lth and a value generated by subtracting a certain offset from the bottom detection value is used as the threshold Rth, the thresholds can be set according to the size of the disturbance caused by the contrast of the recording mark remaining in the differential signal HPF output. In addition, the threshold may be changed according to the internal state of the physical header detection sequencer. Switching the thresholds according to the internal state of the physical header detection sequencer and using optimal thresholds for pulsing in the first and latter half of the physical header region and the beginning of the recording region prevents false evaluation of the header region.

Figure 11:
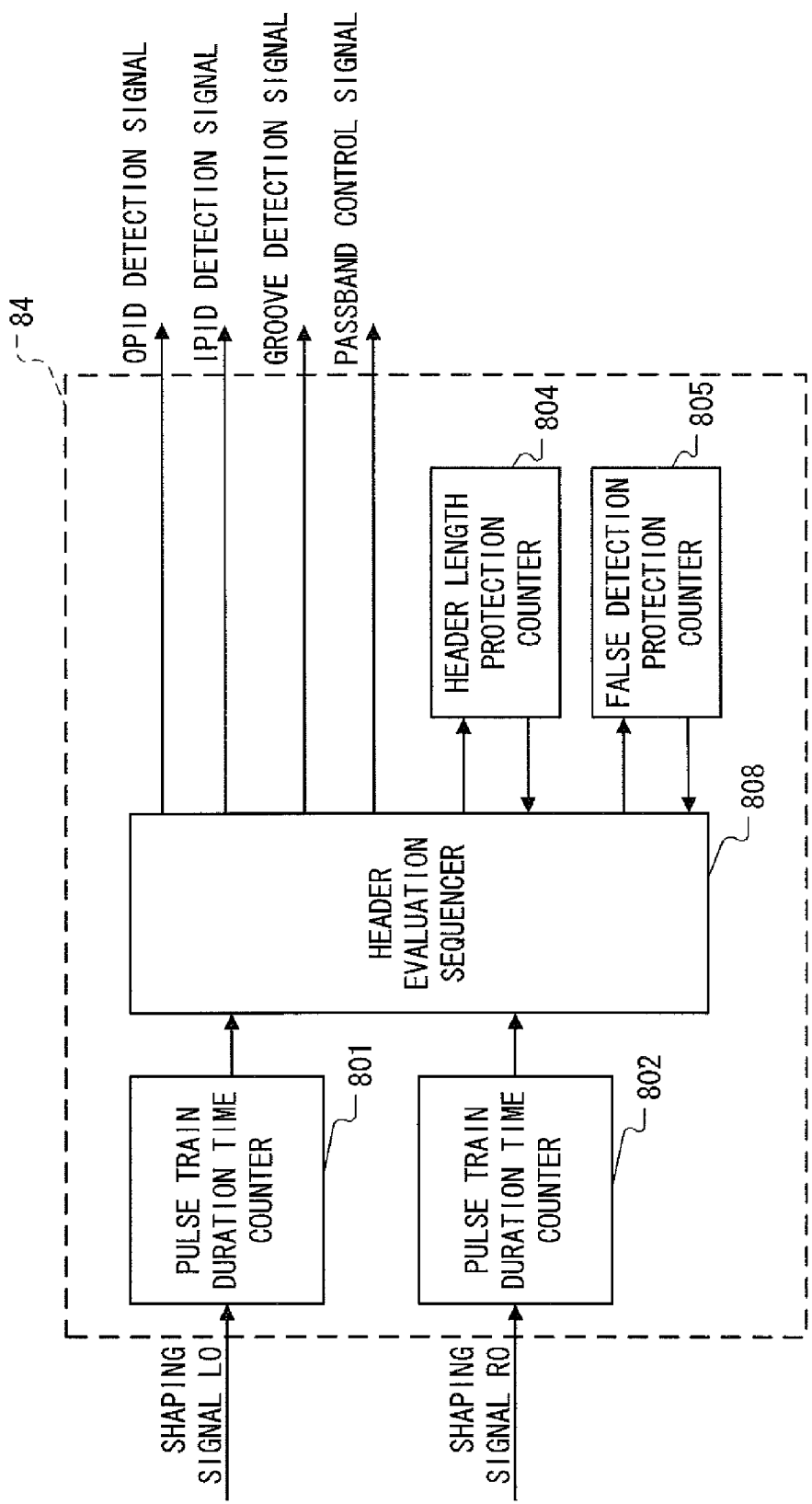
FIG. 11 is a diagram showing a configuration example of a physical header detection sequencer according to a modification of the first embodiment.

Moreover, although the first embodiment explained the case of realizing the header evaluation sequencer 803 and the land/groove evaluation unit 821 in separate configurations in the physical header detection sequencer 8, it is not limited to this configuration example. For example, as shown in FIG. 11, a configuration in which the header evaluation sequencer 808 generates the groove detection signal may be employed. The header evaluation sequencer 808 shown in FIG. 11 performs the function of the land/groove evaluation unit 821 shown in FIG. 2. For example, the header evaluation sequencer 808 may generate the groove detection signal according to the transition of the internal state. Specifically, at the time of the transition from the state S1 to state S3, as the recording sector is on the land track, the header evaluation sequencer 808 switches the groove detection signal to the level "0". Further, at the time of the transition from the state S2 to the state S4, as the recording sector is on the groove track, the header evaluation sequencer 808 switches the groove detection signal to the level "1" and maintains the value held by the groove detection signal in other transitions. The configuration of the physical header detection sequencer 84 shown in FIG. 11 can also be incorporated in the second embodiment.

Furthermore, although the third embodiment explained the case in which the AND gate 843 masks the passband control signal, the band pass control signal may be masked in the header evaluation sequencer 803. In this case, the header evaluation sequencer 803 receives the synchronization flag from the physical header synchronization protection unit 833 and outputs a logical sum signal of the generated passband control signal and the synchronization flag as the passband control signal.

Each of the aforementioned embodiments explained the header region evaluation method according to one embodiment with reference to the configuration example of the optical disc apparatus and the physical header detection sequencer. Generally, a semiconductor integrated circuit for controlling an optical pickup is mounted on an optical disc apparatus. For example, the optical disc apparatus 100 shown in FIG. 1 can realize the method for evaluating the header region explained in each embodiment by mounting the semiconductor integrated circuit including at least the configuration of the header region evaluation circuit 20 shown in FIG. 12. Note that it is assumed that in general other configurations shown in FIG. 1 are included in the semiconductor integrated circuit.

Figure 12:
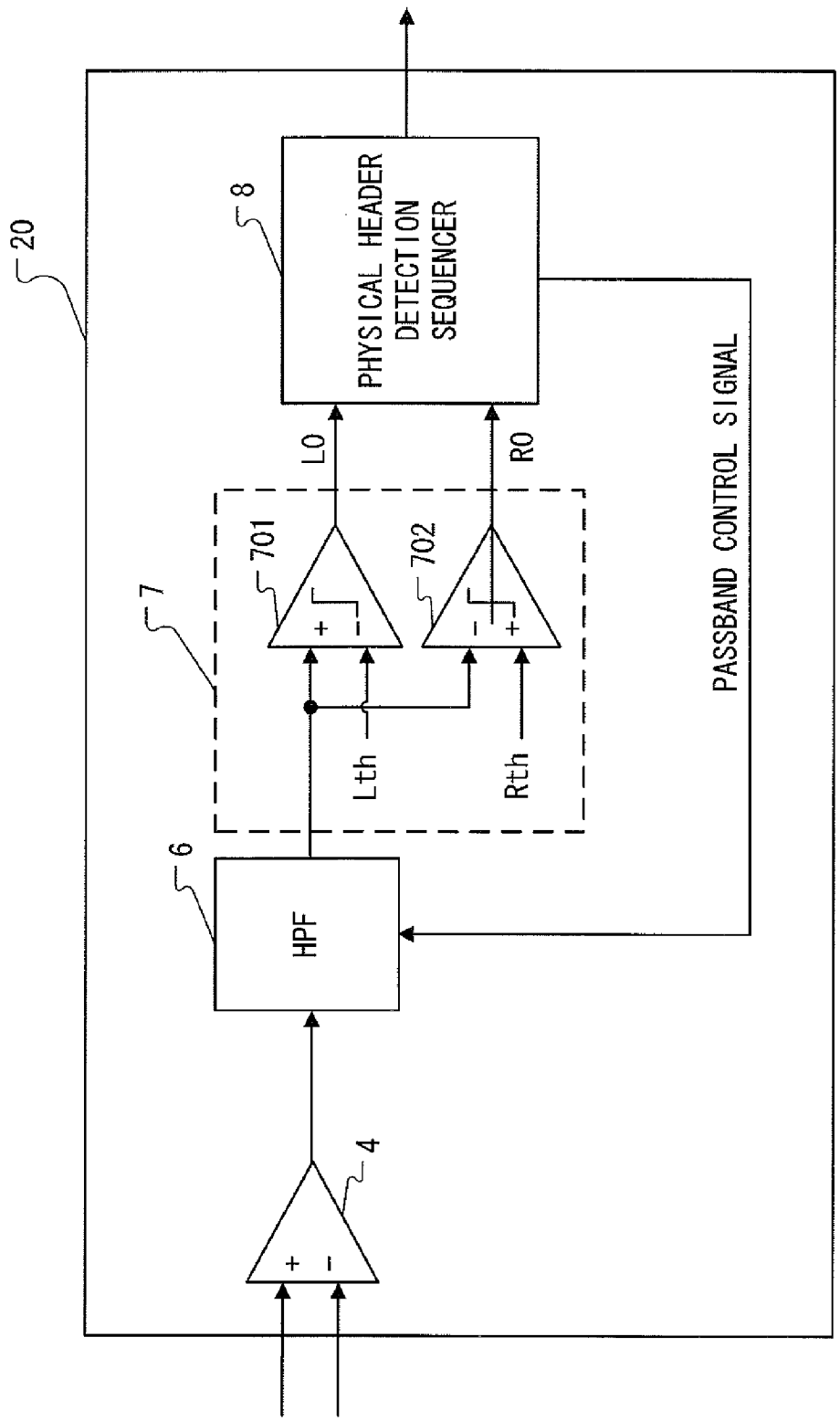
FIG. 12 is a configuration example of a header region evaluation circuit according to an embodiment.

As shown in FIG. 12, in the header region evaluation circuit 20, the difference signal detection unit 4 receives the signal corresponding to the amount of received light from the optical disc generated by the light receiving element that includes light receiving units divided into two, and the physical header detection sequencer 9 outputs at least the groove detection signal. In addition, the physical header detection sequencer 8 generates the passband control signal and controls the high pass filter 6.

Note that although FIG. 12 shows the case of incorporating the physical header detection sequencer 8 shown in FIG. 2, it is not limited to this. For example, any one of the physical header sequencers 82 to 84 shown in FIG. 6, 9 or 11 may be incorporated.

As explained above, the configuration of each embodiment achieves an effect that blocking the low frequency component by the high pass filter removes the offset fluctuation even when noise is generated in the difference signal due to a defect and the like, and thereby leading to less susceptibility to the margin when the difference signal is binarized by the waveform shaping circuit. For example, even when an offset appears in the difference signal by an influence of the defect, the offset is reduced by the time constant determined by the cutoff frequency in the output of the high pass filter, thereby recovering the offset to enable appropriate pulsing in a short time. Moreover, even when the low frequency fluctuation component appears in the difference signal by the seek operation, the high pass filter also has an effect to suppress the offset fluctuation from appearing in the signal that is input to the waveform shaping circuit.

On the other hand, when simply the high pass filter is prepared to block the low frequency component, the offset in the difference signal appearing by the physical header region itself is reduced in the latter half of the first and second parts of the header region, thereby making it difficult to perform stable header region evaluation.

Therefore, the configuration of each embodiment has a function to switch the passband control signal and reduce the cutoff frequency of the high pass filter in at least a part of the header region detected by the physical header detection sequencer. After the pulse train for more than a certain period is detected at the beginning of the header region, reducing the cutoff frequency only for the period corresponding to the first part delays the reduction in the offset amount in the difference signal HPF output in the period where the cutoff frequency is reduced. A square-wave offset change appearing in the difference signal causes the offset in the difference signal HPF output to change while maintaining the square wave.

Similarly, reducing the cutoff frequency for the period corresponding to the second part after the pulse train is detected in the beginning of the second part of the physical header region reflects the square-wave offset in the difference signal in the difference signal HPF output even in the second part. This maintains the state in which the difference signal HPF output exceeds previously prepared reference values and enables stable detection of the physical header region, thereby preventing an influence of the offset fluctuation caused due to a defect or the seek operation and achieving stable detection. According to such an effect, it is possible to provide a header region evaluation method, a header region evaluation circuit, and an optical disc apparatus including the same that hardly cause false evaluation of the physical header region even when a disturbance is generated in the difference signal by the contrast of the recording mark.

While the invention has been described in terms of several embodiments, those skilled in the art will recognize that the invention can be practiced with various modifications within the spirit and scope of the appended claims and the invention is not limited to the examples described above.

Each of embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A header region evaluation circuit for evaluating a physical header region of an optical disc, the optical disc including both a groove and an inter-groove formed on the optical disc as information recording units that are formed of one recording spiral composed by alternately connecting a recording track on the groove and a recording track on the inter-groove, and the optical disc also being composed of a plurality of recording sectors including a physical header region and a recording region, the header region evaluation circuit comprising:
    a difference signal detection unit that detects a difference signal proportional to a difference in amounts of received light from the optical disc received by a light receiving element including light receiving units divided into two;
    a high pass filter that receives a passband control signal and the difference signal, switches at least a first cutoff frequency and a second cutoff frequency according to the passband control signal, removes a low frequency component from the difference signal, and generates a difference signal HPF output, the second cutoff frequency being set to a frequency lower than the first cutoff frequency;
    a waveform shaping unit that holds a pulse threshold and generates a shaping signal to convert the difference signal HPF output into a pulse using the pulse threshold;
    a physical header detection unit that measures duration of the pulse indicated by the shaping signal, detects the physical header region, generates a groove detection signal for evaluating whether the physical header region is either one of the groove and the inter-groove based on a detection result of the physical header region, and generates the passband control signal for controlling a cutoff frequency of the high pass filter to be reduced for the difference signal corresponding to at least a part of the physical header region.

2. The header region evaluation circuit according to claim 1, wherein
    the physical header region includes a first part and a second part, and
    the physical header detection unit generates the passband control signal for controlling the cutoff frequency of the high pass filter to be reduced for at least a part of the difference signal corresponding to either one of the first part and the second part.

3. The header region evaluation circuit according to claim 2, wherein the physical header detection unit controls the cutoff frequency of the high pass filter to be reduced for a predetermined period after determining to detect the first part.

4. The header region evaluation circuit according to claim 2, wherein the physical header detection unit generates the passband control signal for controlling the second cutoff frequency to be set to the high pass filter at least in a period after the first part is detected until the second part is detected and the first cutoff frequency to be set to the high pass filter in a period other than the period to set the second cutoff frequency, previously holds an upper limit of the period to set the second cutoff frequency, and generates the passband control signal for controlling the first cutoff frequency to be set when the period to set the second cutoff frequency exceeds the upper limit.

5. The header region evaluation circuit according to claim 1, wherein
    the waveform shaping unit generates a shaping signal indicating a first pulse and a second pulse based on the difference signal HPF output, the first pulse exceeding the pulse threshold and appearing in a first polarity and the second pulse exceeding the pulse threshold and appearing in a second polarity different from the first polarity, and
    the physical header detection unit comprises:
        a header evaluation unit that outputs a polarity of the first pulse and the second pulse while holding a pulse duration threshold, receiving the shaping signal, generating the passband control signal for controlling the second cutoff frequency to be set to the high pass filter when duration of the first pulse exceeds the pulse duration threshold, and generating the passband control signal for controlling the first cutoff frequency to be set to the high pass filter when duration of the second pulse exceeds the pulse duration threshold after the first pulse is detected, the pulse duration threshold being a pulse width for evaluating detection of the physical header region; and
        a land/groove evaluation unit that generates the groove detection signal according to the polarity of the first pulse and the second pulse.

6. The header region evaluation circuit according to claim 5, wherein the header evaluation unit further holds a region detection threshold for limiting a period to detect the physical header region and generates the passband control signal for controlling the first cutoff frequency to be set to the high pass filter when the period of the region detection threshold is exceeded after the first pulse is detected.

7. The header region evaluation circuit according to claim 6, wherein the header evaluation unit further holds a header region detection threshold for limiting the period to detect the physical header region as the region detection threshold and generates the passband control signal for controlling the first cutoff frequency to be set to the high pass filter when the period of the header region detection threshold is exceeded after the first pulse is detected.

8. The header region evaluation circuit according to claim 6, wherein the header evaluation unit holds a subregion detection threshold for limiting a period to detect the second part as the region detection threshold and generates the passband control signal for controlling the first cutoff frequency to be set to the high pass filter when the period of the subregion detection threshold is exceeded after the first pulse is detected.

9. The header region evaluation circuit according to claim 1, wherein the physical header detection unit generates the passband control signal for controlling the cutoff frequency to be reduced after a beginning of the physical header region is detected until an end of the physical header region is detected.

10. The header region evaluation circuit according to claim 1, wherein
the waveform shaping unit generates a shaping signal indicating a first pulse and a second pulse based on the difference signal HPF output, the first pulse exceeding the pulse threshold and appearing in a first polarity and the second pulse exceeding the pulse threshold and appearing in a second polarity different from the first polarity, and
the physical header detection unit comprises:
a header evaluation unit that outputs a polarity of the first pulse and the second pulse while holding a pulse duration threshold for detecting the physical header region and a pulse non-detected elapsed threshold indicating a threshold of time elapsed since the first pulse is not detected, receiving the shaping signal, generating the passband control signal for controlling the second cutoff frequency to be set to the high pass filter when duration of the first pulse exceeds the pulse duration threshold, and generating the passband control signal for controlling the first cutoff frequency to be set to the high pass filter when duration of the second pulse exceeds the period of the pulse duration threshold and also the period when the first pulse is not detected exceeds the pulse non-detected elapsed threshold; and
a land/groove evaluation unit that generates the groove detection signal according to the polarity of the first pulse and the second pulse.

11. The header region evaluation circuit according to claim 5, wherein
the physical header detection unit further comprises a physical header synchronization protection unit that generates a synchronization flag for evaluating a synchronous state and a header prediction signal for predicting the physical header region based on the detection of the physical header, the synchronization state being a state to maintain the detection of the physical header region
the land/groove evaluation unit receives the polarity of the first pulse and the second pulse, the synchronization flag, and the header prediction signal, generates the groove detection signal according to the header prediction signal when the synchronization flag indicates the synchronous state, and generates the groove detection signal according to the polarity of the first pulse and the second pulse when the synchronization flag indicates an asynchronous state.

12. The header region evaluation circuit according to claim 11, wherein the physical header detection unit generates the passband control signal for controlling the first cutoff frequency to be set to the high pass filter when the synchronization flag indicates the synchronous state, and generates the passband control signal for controlling the second cutoff frequency to be set to the high pass filter for a difference signal corresponding to at least a part of the header region according to the detection result of the physical header region when the synchronization flag indicates the asynchronous state.

13. An optical disc apparatus for evaluating a physical header region of an optical disc and for reproducing information recorded on the optical disc, the optical disc including both a groove and an inter-groove formed on the optical disc as information recording units that are formed of one recording spiral composed by alternately connecting a recording track on the groove and a recording track on the inter-groove, and the optical disc also being composed of a plurality of recording sectors including a physical header region and a recording region, the optical disc apparatus comprising:
an optical pickup including a light receiving element, the light receiving element including light receiving units divided into two;
a difference signal detection unit that detects a difference signal proportional to a difference in amounts of received light from the optical disc received by the light receiving unit;
a high pass filter that receives a passband control signal and the difference signal, switches at least a first cutoff frequency and a second cutoff frequency according to the passband control signal, removes a low frequency component from the difference signal, and generates a difference signal HPF output, the second cutoff frequency being set to a frequency lower than the first cutoff frequency;
a waveform shaping unit that holds a pulse threshold and generates a shaping signal to convert the difference signal HPF output into a pulse using the pulse threshold;
a physical header detection unit that measures duration of the pulse indicated by the shaping signal, detects the physical header region, generates a groove detection signal for evaluating whether the physical header region is either one of the groove and the inter-groove based on a detection result of the physical header region, and generates the passband control signal for controlling a cutoff frequency of the high pass filter to be reduced for the difference signal corresponding to at least a part of the physical header region; and
a polarity control unit that controls a tracking polarity according to the groove detection signal.

14. A header region evaluation method for evaluating a physical header region of an optical disc, the optical disc including both a groove and an inter-groove formed on the optical disc as information recording units that are formed of one recording spiral composed by alternately connecting a recording track on the groove and a recording track on the inter-groove and the optical disc also being composed of a plurality of recording sectors including a physical header region and a recording region, the method comprising:

detecting a difference signal proportional to a difference in amounts of received light from the optical disc received by light receiving units divided into two;

switching a plurality of cutoff frequencies, removing a low frequency component from the difference signal, and generating a difference signal HPF output;

converting the difference signal HPF output into a pulse using a previously held pulse threshold and generating a shaping signal;

measuring duration of the pulse indicated by the shaping signal and detecting the physical header region;

controlling the cutoff frequency of the high pass filter for a difference signal corresponding to at least apart of the physical header region based on a detection result of the physical header region; and evaluating whether the physical header region is the groove or the inter-groove when the physical header region is detected.

15. The header region evaluation method according to claim 14, wherein the physical header region includes a first part and a second part, and the control of the cutoff frequency of the high pass filter further comprises controlling the cutoff frequency of the high pass filter to be reduced for a part of the difference signal corresponding to at least one of the first part and the second part.

16. The header region evaluation method according to claim 15, wherein the control of the cutoff frequency of the high pass filter further comprises controlling the cutoff frequency of the high pass filter to be reduced for a predetermined period after determining to detect the first part.

17. The header region evaluation method according to claim 15, wherein the high pass filter switches at least a first cutoff frequency and a second cutoff frequency including a frequency lower than the first cutoff frequency according to the passband control signal, and the control of the cutoff frequency of the high pass filter further comprises generating the passband control signal for controlling the second cutoff frequency to be set to the high pass filter at least in a period after the first part is detected until the second part is detected and controlling the first cutoff frequency to be set to the high pass filter in a period other than the period to set the second cutoff frequency.

18. The header region evaluation method according to claim 17, wherein the control of the cutoff frequency of the high pass filter further comprises generating the passband control signal for controlling the first cutoff frequency to be set to the high pass filter when the period to set the second frequency exceeds a previously determined upper limit of the period to set the second cutoff frequency.

19. The header region evaluation method according to claim 14, wherein the detection of the physical header region comprises:

detecting from the shaping signal a first pulse exceeding the pulse threshold and appearing in a first polarity and a second pulse appearing in a second polarity different from the first polarity; and evaluating that the physical header region is detected when duration of the first pulse and the second pulse exceeds a previously held pulse duration threshold, and the control of the cutoff frequency of the high pass filter further comprises:

controlling the cutoff frequency to be reduced when the duration of the first pulse exceeds the pulse duration threshold; and controlling the cutoff frequency to return when the duration of the second pulse exceeds the pulse duration threshold after the first pulse is detected.

20. The header region evaluation method according to claim 19, wherein the control of the cutoff frequency of the high pass filter further comprises controlling the cutoff frequency to return when time elapsed since the first pulse is detected exceeds a previously held region detection threshold for limiting a period to detect the physical header region.

21. The header region evaluation method according to claim 20, wherein the control of the cutoff frequency of the high pass filter further comprises controlling the cutoff frequency to return using a header region detection threshold for limiting a period to detect the physical header region as the region detection threshold.

22. The header region evaluation method according to claim 20, wherein the control of the cutoff frequency of the high pass filter further comprises controlling the cutoff frequency to return using a subregion detection threshold for limiting a period to detect the second pulse as the region detection threshold.

23. The header region evaluation method according to claim 14, wherein the control of the cutoff frequency of the high pass filter further comprises controlling the cutoff frequency to be reduced after a beginning of the physical header region is detected until an end of the physical header region is detected.

24. The header region evaluation method according to claim 14, wherein the detection of the physical header region comprises:

detecting from the shaping signal a first pulse exceeding the pulse threshold and appearing in a first polarity and a second pulse appearing in a second polarity different from the first polarity; and evaluating that the physical header region is detected when duration of the first pulse and the second pulse exceeds a previously held pulse duration threshold, and the control of the cutoff frequency of the high pass filter further comprises:

controlling the cutoff frequency to be reduced when the duration of the first pulse exceeds the pulse duration time; and controlling the cutoff frequency to return when the duration of the second pulse exceeds the period of the pulse duration threshold after the first pulse is detected and also when a period when the first pulse is not detected exceeds a previously held pulse non-detected elapsed threshold, the pulse non-detected elapsed threshold indicating a threshold of time elapsed since the first pulse is not detected.

25. The header region evaluation method according to claim 19, wherein the detection of the physical header region further comprises:

evaluating a synchronous state and generating a synchronization flag; and generating a header prediction signal for predicting whether the physical header region is either one of the groove and the inter-groove based on a past detection result of the physical header region, and the evaluation whether the physical header region is either one of the groove and the inter-groove comprises:

evaluating that the physical header region is one of the groove or the inter-groove according to the header prediction signal when the synchronization flag indicates the synchronous state; and evaluating that the physical header region is one of the groove and the inter-groove according to the physical header region is either one of the groove and the inter-groove according to the polarity of the first pulse and the second pulse when the synchronization flag indicates an asynchronous state.

26. The header region evaluation method according to claim 25, wherein the control of the cutoff frequency of the high pass filter comprises:

controlling the cutoff frequency not be reduced and maintained when the synchronization flag indicates the synchronous state; and controlling the cutoff frequency to be reduced for the difference signal corresponding to at least a part of the physical header region according to the detection result of the header region when the synchronization flag indicates the asynchronous state.

\* \* \* \* \*